(12) United States Patent
Yagishita et al.

(10) Patent No.: US 7,277,585 B2
(45) Date of Patent: Oct. 2, 2007

(54) IMAGE ENCODING METHOD, IMAGE ENCODING APPARATUS AND STORAGE MEDIUM

(75) Inventors: Takahiro Yagishita, Kanagawa (JP); Yukiko Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1065 days.

(21) Appl. No.: 10/153,654

(22) Filed: May 24, 2002

(65) Prior Publication Data

US 2002/0191224 A1    Dec. 19, 2002

(30) Foreign Application Priority Data

| May 25, 2001 | (JP) | ............................. 2001-157727 |
| May 30, 2001 | (JP) | ............................. 2001-161811 |
| Dec. 28, 2001 | (JP) | ............................. 2001-401070 |

(51) Int. Cl.
  G06K 9/36    (2006.01)
  G06K 9/46    (2006.01)

(52) U.S. Cl. ...................... 382/232; 382/246; 382/250; 382/251; 358/426.07

(58) Field of Classification Search ................ 382/232, 382/233, 245, 246, 247, 248, 250, 251, 280, 382/282, 283; 358/426.07, 521; 708/403
See application file for complete search history.

(56) References Cited

U.S. PATENT DOCUMENTS

| 4,266,249 | A | * | 5/1981 | Chai et al. ............. 358/426.16 |
| 4,796,003 | A | | 1/1989 | Bentley et al. |
| 4,875,063 | A | | 10/1989 | Idenawa et al. |
| 4,918,489 | A | | 4/1990 | Inage et al. |
| 4,977,414 | A | | 12/1990 | Shimada et al. |
| 5,019,913 | A | | 5/1991 | Kiya et al. |
| 5,107,278 | A | | 4/1992 | Shimada et al. |
| 5,491,506 | A | | 2/1996 | Yagishita et al. |
| 5,565,907 | A | | 10/1996 | Wada et al. |
| 5,714,974 | A | * | 2/1998 | Liu ............................ 345/694 |
| 5,923,828 | A | | 7/1999 | Yagishita |
| 6,459,816 | B2 | | 10/2002 | Matsuura et al. |
| 6,480,823 | B1 | | 11/2002 | Zhao et al. |
| 6,876,774 | B2 | * | 4/2005 | Satoh et al. ................ 382/245 |
| 2006/0055980 | A1 | * | 3/2006 | Takahashi et al. ......... 358/3.03 |

FOREIGN PATENT DOCUMENTS

| JP | 55-50776 | 4/1980 |
| JP | 57-181270 | 11/1982 |

(Continued)

OTHER PUBLICATIONS

U.S. Appl. No. 09/945,840, filed Sep. 5, 2001.

(Continued)

Primary Examiner—Matthew C. Bella
Assistant Examiner—Ali Bayat
(74) Attorney, Agent, or Firm—Oblon, Spivak, McClelland, Maier & Neustadt, P.C.

(57) ABSTRACT

An image encoding method forms units respectively made up of a plurality of pixels belonging to within one period of a digital image data having a periodic property, and carries out an encoding using the units as units of encoding, so that two units which are consecutively encoded are separated by an integer multiple of the period.

11 Claims, 36 Drawing Sheets

FOREIGN PATENT DOCUMENTS

| | | |
|---|---|---|
| JP | 62-236269 | 10/1987 |
| JP | 63-102559 | 5/1988 |
| JP | 64-77371 | 3/1989 |
| JP | 3-247167 | 11/1991 |
| JP | 4-265020 | 9/1992 |
| JP | 5-241777 | 9/1993 |
| JP | 6-178120 | 6/1994 |
| JP | 10-136356 | 5/1998 |

OTHER PUBLICATIONS

U.S. Appl. No. 09/085,714, filed May 28, 1998, allowed.
U.S. Appl. No. 09/330,007, filed Jun. 11, 1999, pending.
U.S. Appl. No. 09/401,503, filed Sep. 22, 1999, allowed.
U.S. Appl. No. 09/455,923, filed Dec. 7, 1999, allowed.
U.S. Appl. No. 09/565,545, filed May 5, 2000, pending.
U.S. Appl. No. 09/664,832, filed Sep. 19, 2000, pending.
U.S. Appl. No. 10/153,654, filed May 24, 2002, pending.
U.S. Appl. No. 10/230,090, filed Aug. 29, 2002, pending.
U.S. Appl. No. 10/153,654, filed May 24, 2002, Yagishita et al.
U.S. Appl. No. 10/617,193, filed Jul. 11, 2003, Yamazaki et al.
U.S. Appl. No. 10/797,066, filed Mar. 11, 2004, Yamazaki et al.

* cited by examiner

FIG.1B

| 50 | 100 | 30 | 80 |
|---|---|---|---|
| 10 | 150 | 120 | 60 |
| 130 | 40 | 90 | 160 |
| 70 | 140 | 110 | 20 |

FIG.1A

| 2 | 10 | 18 | 26 | 34 | 42 | 50 | 58 | 66 | 74 | 82 | 90 | 98 | 106 | 114 | 122 |
|---|---|---|---|---|---|---|---|---|---|---|---|---|---|---|---|
| 10 | 18 | 26 | 34 | 42 | 50 | 58 | 66 | 74 | 82 | 90 | 98 | 106 | 114 | 122 | 130 |
| 18 | 26 | 34 | 42 | 50 | 58 | 66 | 74 | 82 | 90 | 98 | 106 | 114 | 122 | 130 | 138 |
| 26 | 34 | 42 | 50 | 58 | 66 | 74 | 82 | 90 | 98 | 106 | 114 | 122 | 130 | 138 | 146 |
| 34 | 42 | 50 | 58 | 66 | 74 | 82 | 90 | 98 | 106 | 114 | 122 | 130 | 138 | 146 | 154 |
| 42 | 50 | 58 | 66 | 74 | 82 | 90 | 98 | 106 | 114 | 122 | 130 | 138 | 146 | 154 | 162 |
| 50 | 58 | 66 | 74 | 82 | 90 | 98 | 106 | 114 | 122 | 130 | 138 | 146 | 154 | 162 | 170 |
| 58 | 66 | 74 | 82 | 90 | 98 | 106 | 114 | 122 | 130 | 138 | 146 | 154 | 162 | 170 | 178 |

| n | Golomb-Rice code | | | |
|---|---|---|---|---|
| | 2ND ORDER | 4TH ORDER | 8TH ORDER | 16TH ORDER |
| 0 | 01 | 001 | 0001 | 00001 |
| 1 | 11 | 011 | 0011 | 00011 |
| 2 | 001 | 101 | 0101 | 00101 |
| 3 | 101 | 111 | 0111 | 00111 |
| 4 | 0001 | 0001 | 1001 | 01001 |
| 5 | 1001 | 0101 | 1011 | 01011 |
| 6 | 00001 | 1001 | 1101 | 01101 |
| 7 | 10001 | 1101 | 1111 | 01111 |
| 8 | 000001 | 00001 | 00001 | 10001 |
| 9 | 100001 | 01001 | 00101 | 10011 |
| 10 | 0000001 | 10001 | 01001 | 10101 |
| 11 | 1000001 | 11001 | 01101 | 10111 |
| 12 | 00000001 | 000001 | 10001 | 11001 |
| 13 | 10000001 | 010001 | 10101 | 11011 |
| 14 | 000000001 | 100001 | 11001 | 11101 |
| 15 | 100000001 | 110001 | 11101 | 11111 |
| 16 | 0000000001 | 0000001 | 000001 | 000001 |
| 17 | 1000000001 | 0100001 | 001001 | 000101 |
| 18 | 00000000001 | 1000001 | 010001 | 001001 |

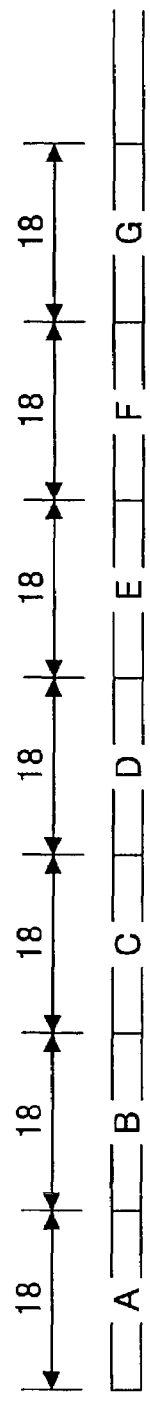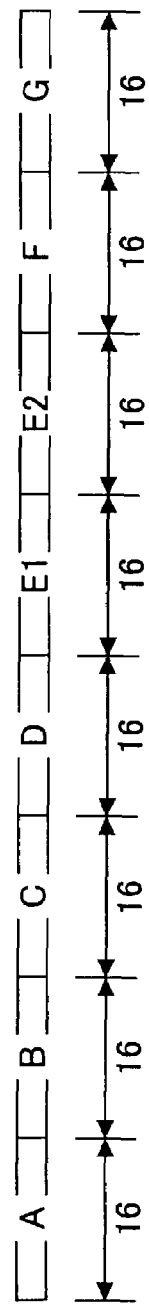
FIG.16A
FIG.16B

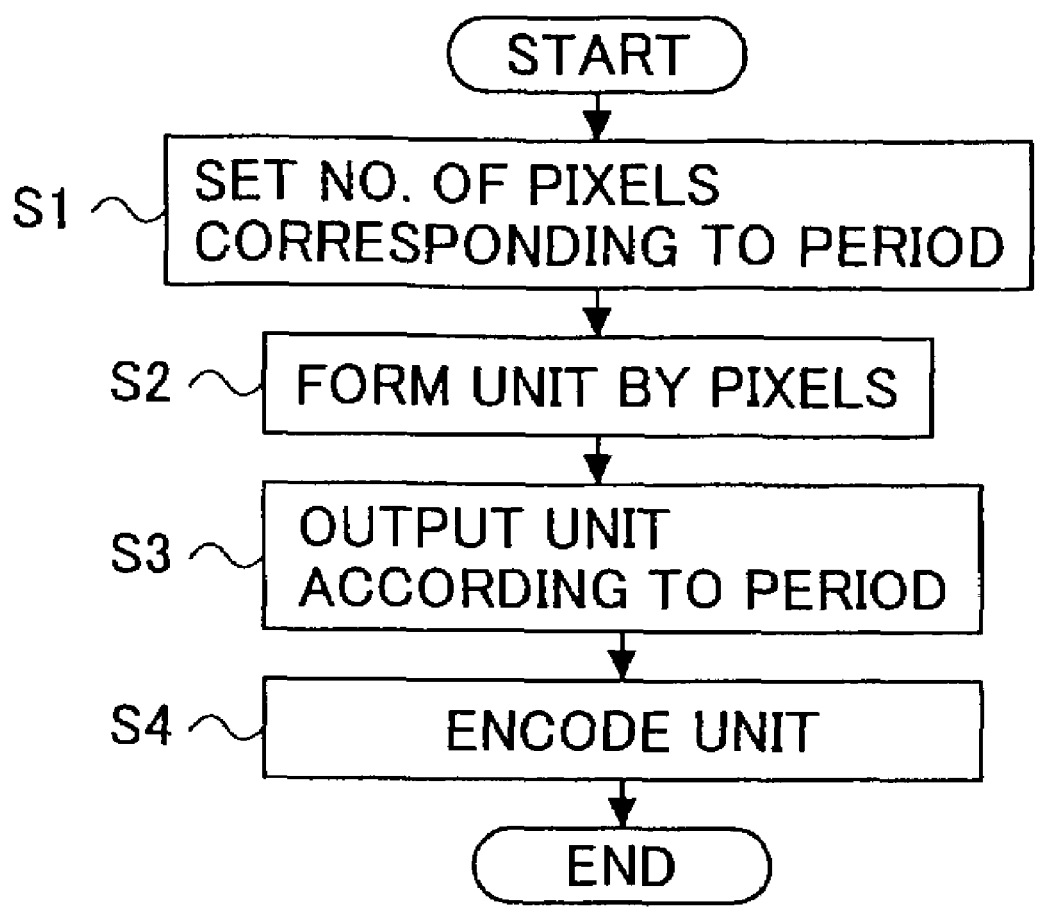

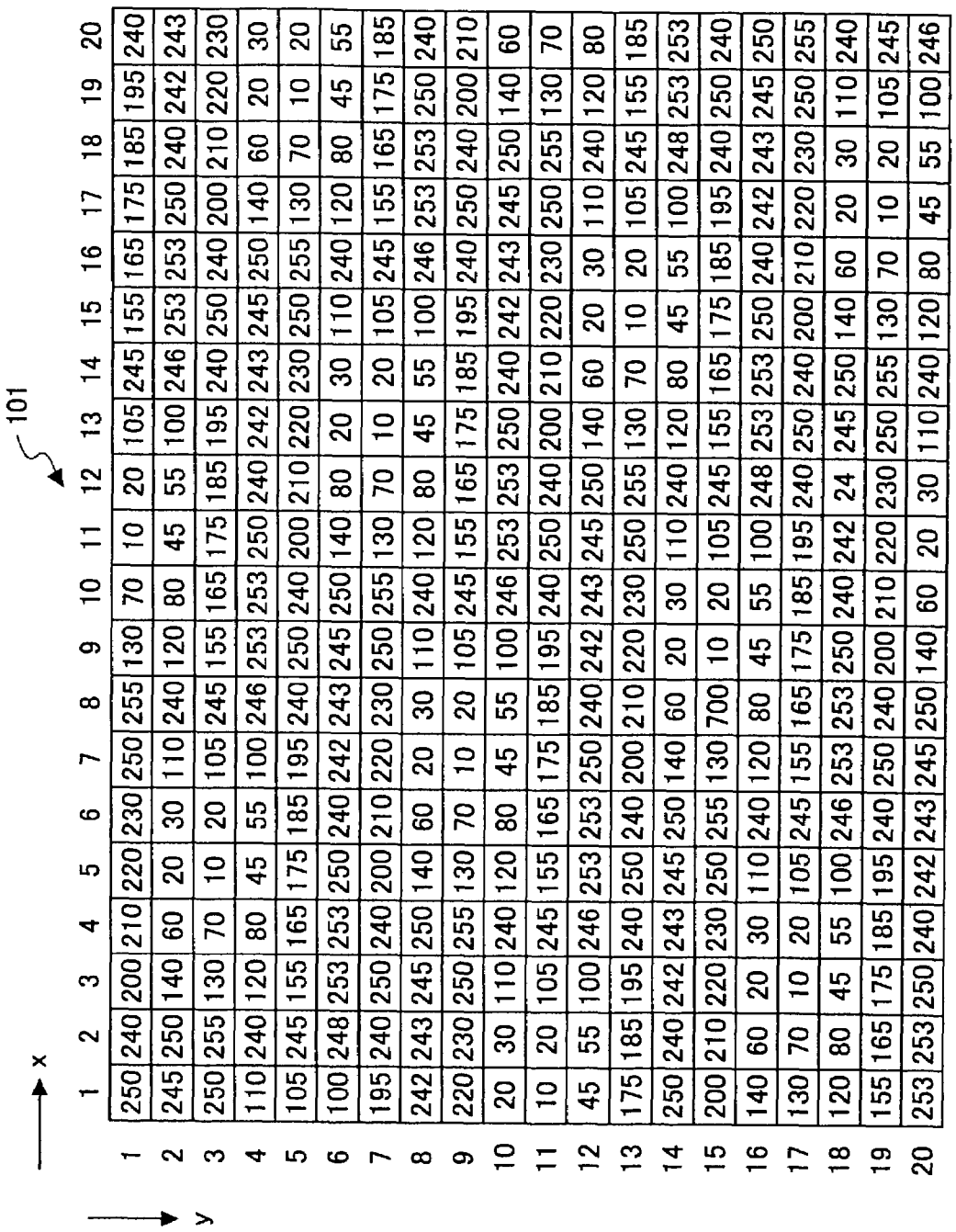

FIG.25A

| INDEX | DICTIONARY 1 |
|---|---|
| 0 | 0 |
| 1 | 1 |
| 2 | 2 |
| 3 | 3 |
| 4 | 4 |
| 5 | 5 |
| 6 | 6 |
| 7 | 7 |
| ... | ... |
| F | F |

FIG.25B

| DICTIONARY 2 | Golomb-Rice code |
|---|---|
| F | 01 |
| 8 | 11 |
| 7 | 001 |
| E | 101 |
| 1 | 0001 |
| 6 | 1001 |
| 3 | 00001 |
| 9 | 10001 |
| ... | ... |
| 5 | 100000001 |

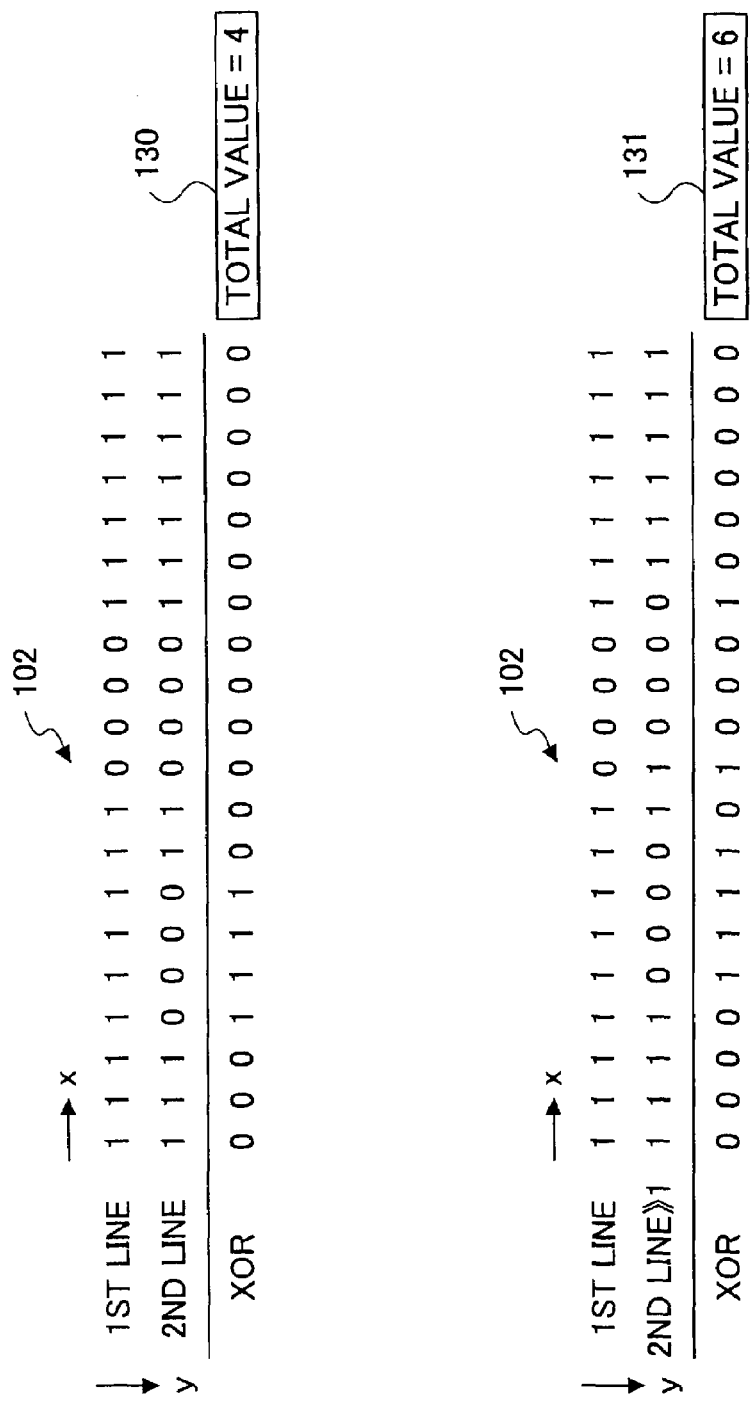

FIG.29B

| n | Golomb-Rice code | | | |
|---|---|---|---|---|
| | 2ND ORDER | 4TH ORDER | 8TH ORDER | 16TH ORDER |
| 0 | 01 | 001 | 0001 | 00001 |
| 1 | 11 | 011 | 0011 | 00011 |
| 2 | 001 | 101 | 0101 | 00101 |
| 3 | 101 | 111 | 0111 | 00111 |
| 4 | 0001 | 0001 | 1001 | 01001 |
| 5 | 1001 | 0101 | 1011 | 01011 |
| 6 | 00001 | 1001 | 1101 | 01101 |
| 7 | 10001 | 1101 | 1111 | 01111 |
| 8 | 000001 | 00001 | 00001 | 10001 |
| 9 | 100001 | 01001 | 00101 | 10011 |
| 10 | 0000001 | 10001 | 01001 | 10101 |
| 11 | 1000001 | 11001 | 01101 | 10111 |
| 12 | 00000001 | 000001 | 10001 | 11001 |
| 13 | 10000001 | 010001 | 10101 | 11011 |
| 14 | 000000001 | 100001 | 11001 | 11101 |
| 15 | 100000001 | 110001 | 11101 | 11111 |
| 16 | 0000000001 | 0000001 | 000001 | 000001 |
| 17 | 1000000001 | 0100001 | 001001 | 000101 |
| 18 | 00000000001 | 1000001 | 010001 | 001001 |

IMAGE ENCODING METHOD, IMAGE ENCODING APPARATUS AND STORAGE MEDIUM

BACKGROUND OF THE INVENTION

This application claims the benefit of a Japanese Patent Applications No. 2001-157727 filed May 25, 2001, No. 2001-161811 filed May 30, 2001 and No. 2001-401070 filed Dec. 28, 2001, in the Japanese Patent Office, the disclosures of which are hereby incorporated by reference.

1. Field of the Invention

The present invention generally relates to image encoding methods, image encoding apparatuses and storage media, and more particularly to an image encoding method for encoding an image having a periodic property such as a dither image using a dither matrix, an image encoding apparatus which employs such an image encoding method to encode an image, and a computer-readable storage medium which stores a program for causing a computer to carry out such an image encoding method.

2. Description of the Related Art

When outputting image data with respect to an image processing apparatus having a small number of gradation levels that can be represented per pixel, a systematic dither method is used in most cases. For example, in a printer or facsimile machine which prints depending on existence of dots, it is normally only possible to represent 2 gradation levels per pixel. When representing a halftone such as a photograph on such an image processing apparatus, an image created by the systematic dither method is used as shown in FIGS. 1A through 1C.

FIGS. 1A through 1C are diagrams for explaining an example of a dither process using the systematic dither method. FIG. 1A shows an example of multi gradation level (multilevel) data prior to the dither process. FIG. 1B shows an example of a dither matrix applied to the multilevel data shown in FIG. 1A. In addition, FIG. 1C shows an example of image data after applying the dither matrix shown in FIG. 1B to the multilevel data shown in FIG. 1A. The dither process compares the original multilevel data shown in FIG. 1A and the values (threshold values) of the dither matrix shown in FIG. 1B, and outputs the compared result as shown in FIG. 1C. Because the dither matrix is used repeatedly, the image created by the dither process has the same periodic property as the dither matrix. This periodic property is particularly conspicuous in the case of images having a large number of low-frequency components, such as photographs.

As a technique for compressing and encoding the dither image having the periodic property, there is a known technique which focuses on the dither matrix which is used to create the dither image. Such a technique is proposed in a Japanese Laid-Open Patent Application No. 55-050776, for example, and data of pixels of the same phase in the dither matrix are collected and encoded. Data of adjacent pixels of the same phase have a strong tendency of taking the same value, because the image data normally includes a large number of low-frequency components. In a case where the original multilevel data are the same for all pixels (only D.C. components exist), the data of the pixels of the same phase of the dither matrix always have the same value. Due to this general tendency, it is possible to obtain a high compression rate when a run length encoding, for example, is carried out after collecting the data of the pixels of the same phase of the dither matrix.

However, according to the technique proposed in the Japanese Laid-Open Patent Application No. 55-050776, the data of the pixels of the same phase are collected for each pixel position, and there was a problem in that the processing speed is slow. For example, when carrying out the encoding by collecting data of 16 pixels of the same phase, it becomes necessary to make 16 memory accesses if the data of only one pixel of a certain phase can be obtained in one memory access. For this reason, it is only possible to encode the data of one pixel during the time of one memory access. In order to increase the processing speed, it was necessary to either prepare a register which can hold the data of the pixels of all phases obtained by 16 memory accesses or, to increase the circuit scale so that it is possible to obtain the data of the 16 pixels of the same phase in one memory access.

SUMMARY OF THE INVENTION

Accordingly, it is a general object of the present invention to provide a novel and useful image encoding method, image encoding apparatus and storage medium, in which the problems described above are eliminated.

Another and more specific object of the present invention is to provide an image encoding method, an image encoding apparatus and a storage medium, which can encode an image having a periodic property, such as a dither image using a dither matrix, at a high speed and a high compression rate but requiring only a small circuit scale.

Other objects of the present invention include:

(a) enabling a high-speed process by encoding in units of a plurality of pixels, and utilizing the periodic property of the image when creating the encoding unit, so as to aggregate the kinds of encoding elements generated and improve the compression rate;

(b) reducing a size of a unit of encoding to 1/M times a period of the image data and aggregating the patterns generated so as to improve the compression rate or, increasing the size of the unit of encoding to M times the period of the image data and suppressing the total number of symbols so as to improve the compression rate;

(c) since an arbitrary period is generated in the image data by magnification when a resolution conversion is made, determining a symbol encoding sequence utilizing both the period generated by the resolution conversion and a period of the image data generated due to a gradation process after the magnification, so as to improve continuity of similar patterns and to improve the compression rate;

(d) using a least common multiple of the period generated by the resolution conversion and the period of the image data generated due to the gradation process as a period with which the unit determining the encoding sequence is extracted, to further improve the continuity of the similar patterns and to further improve the compression rate;

(e) because pixels considerably separated in a main scan direction may become continuous depending on the value of the least common multiple and similarity to the actual image may be lost to deteriorate the compression rate, setting a predetermined threshold value to avoid deterioration of the compression rate;

(f) carrying out a resolution conversion which makes the period of the image data after the gradation process equal to the period generated by the resolution conversion, so as to improve the continuity of the similar patterns in the encoding sequence and to improve the compression rate;

(g) judging whether or not to change a resolution conversion method depending on a predetermined condition, so as to prevent image deterioration of the image subjected to the magnification; and (h) matching the period generated by the resolution conversion and the period of the image data after the gradation process, so as to improve the continuity of the similar patterns and to improve the compression rate.

Still another object of the present invention is to provide an image encoding method comprising the steps of forming units respectively made up of a plurality of pixels belonging to within one period of a digital image data having a periodic property; and carrying out an encoding using the units as units of encoding so that two units which are consecutively encoded are separated by an integer multiple of the period. According to the image encoding method of the present invention, it is possible to encode an image having a periodic property, such as a dither image using a dither matrix, at a high speed and a high compression rate but requiring only a small circuit scale.

A further object of the present invention is to provide an image encoding apparatus comprising unit forming means for forming units respectively made up of a plurality of pixels belonging to within one period of a digital image data having a periodic property; and encoding means for carrying out an encoding using the units as units of encoding so that two units which are consecutively encoded are separated by an integer multiple of the period. According to the image encoding apparatus of the present invention, it is possible to encode an image having a periodic property, such as a dither image using a dither matrix, at a high speed and a high compression rate but requiring only a small circuit scale.

Another object of the present invention is to provide an image encoding apparatus comprising unit forming means for forming units respectively made up of a plurality of pixels belonging to within one period of a digital image data having a periodic property; and encoding means for carrying out an encoding using the units as units of encoding so that two units which are consecutively encoded are separated by N times the period, where N is a natural number, and a number of pixels forming each of the units is determined based on the period. According to the image encoding apparatus of the present invention, it is possible to encode an image having a periodic property, such as a dither image using a dither matrix, at a high speed and a high compression rate but requiring only a small circuit scale.

Still another object of the present invention is to provide an image encoding apparatus comprising unit forming means for forming units respectively made up of a plurality of pixels belonging to within one period of a digital image data having a periodic property; a dictionary table registering symbols used for an encoding; encoding means for carrying out the encoding using the registered symbols in the dictionary table; and updating means for comparing a pattern of the unit and the registered symbols in the dictionary table, and moving a matching registered symbol to a beginning portion of the dictionary table. According to the image encoding apparatus of the present invention, it is possible to encode an image having a periodic property, such as a dither image using a dither matrix, at a high speed and a high compression rate but requiring only a small circuit scale, and the compression efficiency can further be improved by use of an updating type dictionary table.

A further object of the present invention is to provide a computer-readable storage medium which stores a program for causing a computer to carry out an image encoding process, where the program comprises a procedure which causes the computer to form units respectively made up of a plurality of pixels belonging to within one period of a digital image data having a periodic property; and a procedure which causes the computer to carry out an encoding process using the units as units of encoding so that two units which are consecutively encoded are separated by an integer multiple of the period. According to the computer-readable storage medium of the present invention, it is possible to encode an image having a periodic property, such as a dither image using a dither matrix, at a high speed and a high compression rate.

Another object of the present invention is to provide a computer-readable storage medium which stores a program for causing a computer to carry out an image encoding process, where the program comprises a procedure which causes the computer to form units respectively made up of a plurality of pixels belonging to within one period of a digital image data having a periodic property; and a procedure which causes the computer to carry out an encoding process using the units as units of encoding so that two units which are consecutively encoded are separated by N times the period, where N is a natural number, and a number of pixels forming each of the units is determined based on the period. According to the computer-readable storage medium of the present invention, it is possible to encode an image having a periodic property, such as a dither image using a dither matrix, at a high speed and a high compression rate.

Still another object of the present invention is to provide a computer-readable storage medium which stores a program for causing a computer to carry out an image encoding process, where the program comprises a procedure which causes the computer to form units respectively made up of a plurality of pixels belonging to within one period of a digital image data having a periodic property; a procedure which causes the computer to carry out an encoding process using registered symbols in a dictionary table; and a procedure which causes the computer to compare a pattern of the unit and the registered symbols in the dictionary table, and move a matching registered symbol to a beginning portion of the dictionary table. According to the computer-readable storage medium of the present invention, it is possible to encode an image having a periodic property, such as a dither image using a dither matrix, at a high speed and a high compression rate, and the compression efficiency can further be improved by use of an updating type dictionary table.

A further object of the present invention is to provide an image encoding method comprising the steps of (a) detecting whether or not an input image data has a periodic property; (b) carrying out a first encoding process if the step (a) detects no periodic property of the input image data; and (c) carrying out a second encoding process which is different from the first encoding process if the step (a) detects the periodic property of the input image data, where the step (c) forms units respectively made up of a plurality of pixels belonging to within one period of the input image data, and carries out an encoding using the units as units of encoding so that two units which are consecutively encoded are separated by an integer multiple of the period. According to the image encoding method of the present invention, it is possible to carry out a suitable encoding process which is appropriate for each type of image data.

Another object of the present invention is to provide an image encoding apparatus comprising detecting means for detecting whether or not an input image data has a periodic property; first encoding means for carrying out a first encoding process if the detecting means detects no periodic property of the input image data; and second encoding means for carrying out a second encoding process which is different from the first encoding process if the detecting means detects the periodic property of the input image data, where the second encoding means comprises unit forming means for forming units respectively made up of a plurality of pixels belonging to within one period of the input image data; and encoding means for carrying out an encoding using the units as units of encoding so that two units which are consecutively encoded are separated by an integer multiple of the period. According to the image encoding apparatus of the present invention, it is possible to carry out a suitable encoding process which is appropriate for each type of image data.

Still another object of the present invention is to provide a computer-readable storage medium which stores a program for causing a computer to carry out an image encoding process, where the program comprises a detecting procedure which causes the computer to detect whether or not an input image data has a periodic property; a first encoding procedure which causes the computer to carry out a first encoding process if the detecting procedure detects no periodic property of the input image data; and a second encoding procedure which causes the computer to carry out a second encoding process which is different from the first encoding process if the detecting procedure detects the periodic property of the input image data, and the second encoding procedure causing the computer to form units respectively made up of a plurality of pixels belonging to within one period of the input image data, and to carry out an encoding using the units as units of encoding so that two units which are consecutively encoded are separated by an integer multiple of the period. According to the computer-readable storage medium of the present invention, it is possible to carry out a suitable encoding process which is appropriate for each type of image data.

Other objects and further features of the present invention will be apparent from the following detailed description when read in conjunction with the accompanying drawings.

BRIEF DESCRIPTION OF THE DRAWINGS

FIGS. 1A through 1C are diagrams for explaining an example of a dither process using the systematic dither method;

FIG. 8 is a diagram showing a Golomb-Rice code table;

FIGS. 16A and 16B are diagrams for explaining an enlarging process of a resolution conversion;

FIG. 17 is a flow chart for explaining a first embodiment of an image encoding process;

FIG. 22 is a diagram showing a dither matrix used in the fifth embodiment;

FIGS. 25A and 25B are diagrams showing dictionaries corresponding to indexes;

FIGS. 28A and 28B are diagrams for explaining a parameter learning process;

FIGS. 29A, 29B and 29C are diagrams for explaining a fifth embodiment of the encoding process;

DESCRIPTION OF THE PREFERRED EMBODIMENTS

Figure 2:
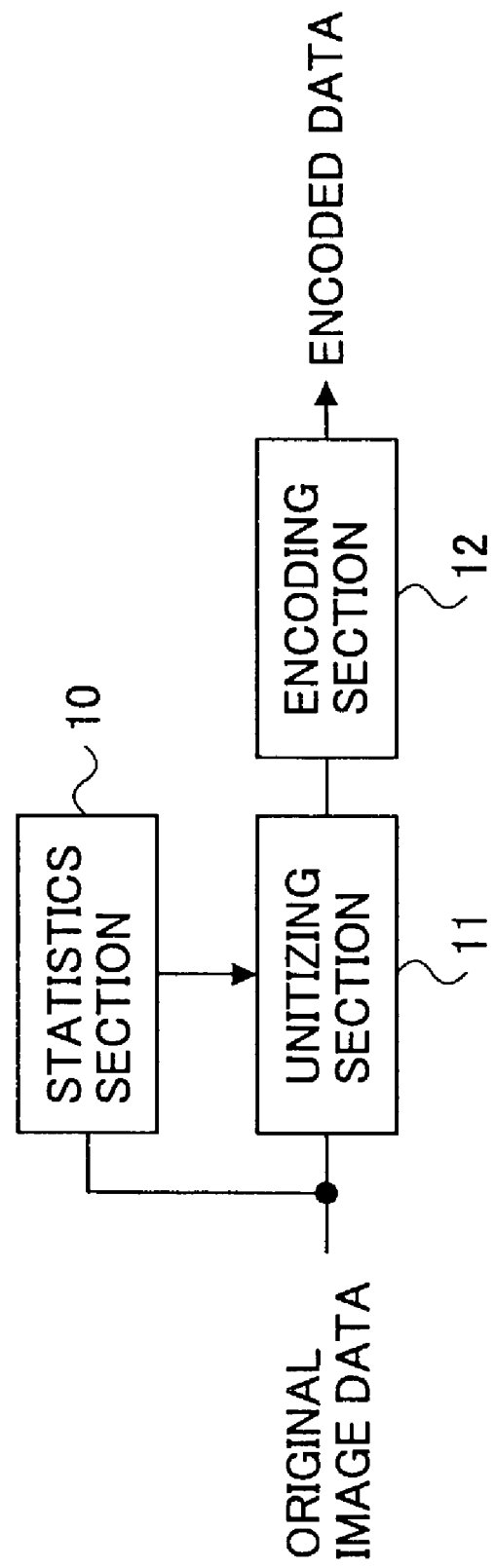
FIG. 2 is a system block diagram showing a first embodiment of an image encoding apparatus according to the present invention.

FIG. 2 is a system block diagram showing a first embodiment of an image encoding apparatus according to the present invention. The image encoding apparatus shown in FIG. 2 includes a statistics section 10, a unitizing section 11, and an encoding section 12. The statistic section 10 extracts feature information from a digital image data which is input as an original image data. The unitizing section 11 uses the feature information extracted by the statistics section 10 as a parameter to extract a plurality of pixels (pixel data) which form a unit of encoding. The encoding section 12 allocates actual codes for each unit which is formed by the plurality of pixels (pixel data) and is extracted by the unitizing section 11. The digital image data has a periodic property within one image data (one frame). For example, the digital image data may be related to an image which has been subjected to a dither process using a dither matrix, related to an image having an arbitrary repetition pattern, or related to any image having some kind of periodic property. Of course, the application of the present invention is not limited to the processing of binary dither image, and the present invention may process a multilevel dither image as long as the image has a periodic property.

The present invention employs a sequence in which the feature information with respect to an image region for which the image encoding is already ended is used as the present parameter for the encoding. The parameter in an initial state is set to a prescribed value. According to this sequence, even if regions having different features exist within one image, such as different dither matrix regions and different tone regions, the feature information of the image region is successively updated to follow causes of variations within the image. As a result, it is possible to carry out an encoding which adaptively realizes a high compression rate. Of course, the present invention is not limited to such an adaptive processing, and the feature information of the image region may be created in a first path and the encoding using the feature information may be carried out in a second path.

The present feature information with respect to the image region may be used as the present parameter for the encoding. In this case, the image data can be compressed further compared to the compression achieved by the image encoding apparatus shown in FIG. 2, but it is necessary to separately store the used parameters for the encoding. Hence, when the compression rate as a whole is taken into consideration, the compression achieved by the image encoding apparatus shown in FIG. 2 is more advantageous in that a number of code streams can be set to one.

A description will now be given of the unitizing section 11 shown in FIG. 2. The unitizing section 11 includes a buffer memory for temporarily holding the image data which is transferred in a raster sequence. For example, this buffer memory formed by a 1024-bit (64 pixels by 16 periods) SRAM for holding the image data of at least 16 periods with respect to an input image data (1 bit/pixel) having a maximum period of 64 pixels (64 bits) in a main scan direction.

Figure 3:
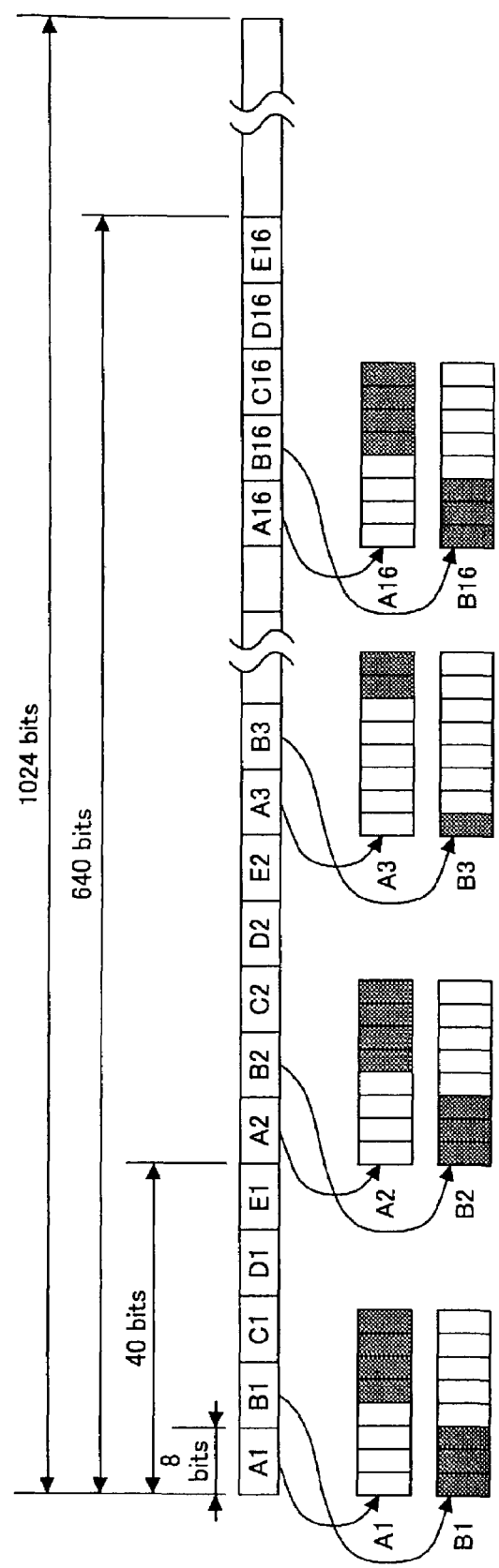
FIG. 3 is a diagram showing an encoding sequence of the unit used in the first embodiment.

FIG. 3 is a diagram showing an encoding sequence of the unit used in this first embodiment. FIG. 3 shows a state where 16 periods of binary image data having a period of 40 pixels are transferred to the buffer memory. The unitizing section 11 successively extracts one unit made up of a plurality of pixels from the buffer memory, and outputs the extracted unit to the encoding section 12. In the case shown in FIGS. 3, 8 adjacent pixels in the main scan direction are extracted as one unit, and reference numerals A1, B1, C1, . . . indicate the output sequence of the units.

In FIG. 3, after the leftmost unit A1 is output, the unit A2 which is located at a position separated by 40 pixels is output, and not the unit B1 located immediately on the right of the leftmost unit A1. The position separated by 40 pixels means that, counted from the first pixel (leftmost pixel) of the unit A1, it is 40 pixels to the first pixel (leftmost pixel) of the unit A2. Hence, if the image data is created using a dither matrix having a size of 40 pixels, the image data has a periodic property with a period of 40 pixels, and the possibility that the data of the unit A1 and the data of the unit A2 have the same values is high. This is because, the number of low-frequency components included in the original multilevel data is large, as described above.

A high compression rate can be expected if it is possible to successively encode the unit data having the same values. The units A1, A2, A3, . . . , A16 are successively extracted in this sequence, the units B1, B2, B3, . . . , B16 are successively extracted next in this sequence, and the units C1, . . . are successively extracted similarly thereafter. Since one unit is formed by the pixels existing within one period of the image, one unit can be extracted by one access to the buffer memory, thereby making it possible to carry out the encoding at a high speed. The two units which are consecutively encoded are separated by a distance which is set to an integer multiple of the period of the image. As shown in FIG. 3, after encoding the unit A1, the unit A2 which is next encoded is 40 pixels or one times the period separated from the unit A1, and the unit A3 which is next encoded is 80 pixels or two times the period separated from the unit A1, and so on. In other words, the first pixel (leftmost pixel) of the unit A1 to the first pixel (leftmost pixel) of the unit which is next encoded is regarded as a distance between the two units, and the encoding sequence is set so that the distance between the two units is an integer multiple of the period.

In addition, instead of relying solely on the low-frequency component of the original multilevel data, it is possible to employ a prediction technique so as to further increase the number of consecutive units which are extracted and have the same values. For example, the number of black pixels differ between the units B2 and B3 shown in FIG. 3 and the values of these units B2 and B3 are not the same, but the number of black pixels are the same for the units B2 and B16 and the values of these units B2 and B16 are the same. This is because, the tone of the original multilevel data differs in the regions of the units B2 and B3, but is the same in the regions of the units B2 and B16. Even if the two units are separated by two or more times the period, it is possible to further increase the possibility of consecutive occurrence of the same values by making the units of the regions with close tones consecutive. The regions having the close tones can be predicted from the data of the encoded units having the adjacent phases.

In the case shown in FIG. 3, the extracting sequence of the units B1 through B16 is predicted from the data of the units A1 through A16. For example, the units B1 through B16 may be extracted in a sequence starting from the largest number of black pixels in the units Al through A16. In the case shown in FIG. 3, the number of pixels is 2 in the unit A3, the number of black pixels is 4 in the other units A1, A2 and A16, and if there is no other unit having 4 black pixels, the unit B2 having 3 black pixels and the unit B16 having 4 black pixels are consecutively extracted. According to this technique, it is unnecessary to newly store information indicating the sequence in which the units B1 through B16 are extracted, because the data of the encoded units are used. When decoding the units, a rule similar to that employed during the encoding is used, so that the sequence of the units B1 through B16 can be restored from the decoded units A1 through A16.

The statistics section 10 shown in FIG. 2 counts the number of black pixels and determines the encoding sequence. Instead of sorting the units based on the black pixels, it is possible judge whether or not the number of black pixels of each unit exceeds a predetermined value, and successively extract the units from the left starting from the unit having a number black pixels less than or equal to the predetermined value. The possibility that the data of the consecutive units have the same values slightly deteriorates in this case, but it is possible to omit a completed sorting process. Therefore, the encoding sequence of the units can be determined adaptively by prediction from the encoded region.

Figure 4:
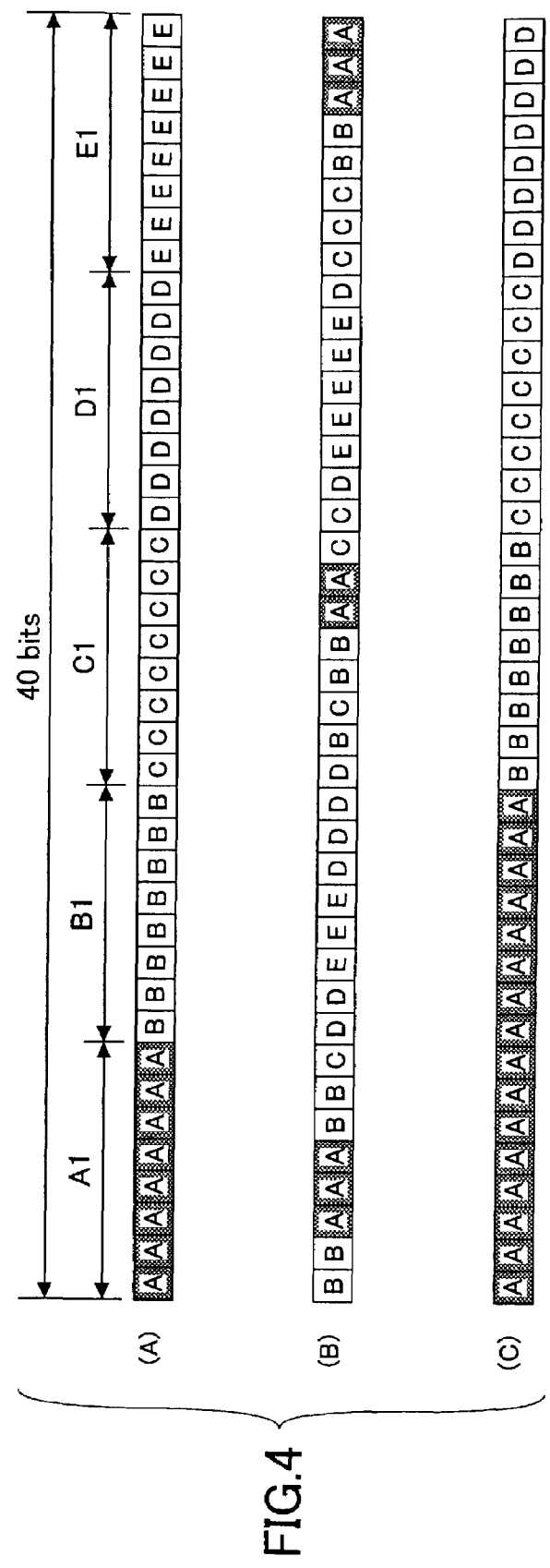
FIG. 4 is a diagram showing pixel positions of the units used in the first embodiment.

FIG. 4 is a diagram showing pixel positions of the units used in this first embodiment. Patterns of the units belonging to within one period will be described by assuming for the sake of convenience that one period amounts to 40 pixels. As shown in FIG. 3 described above, the case shown in FIG. 3 extracts the units A1, B1, C1, D1 and E1 as shown in FIG. 4(A) by forming each unit from 8 adjacent pixels. But it is not essential to form one unit from adjacent pixels, and each unit may be formed from non-adjacent pixels as shown in FIG. 4(B). In this case, however, the pixels belonging to each unit must belong to within one period of the image, similarly to the above described case. In addition, it is possible to form one unit from a number of pixels other than 8, such as 16 pixels, for example, as shown in FIG. 4(C). The pixels forming the unit are selected with reference to statistic information values which will be described later in conjunction with FIG. 5.

Figure 5:
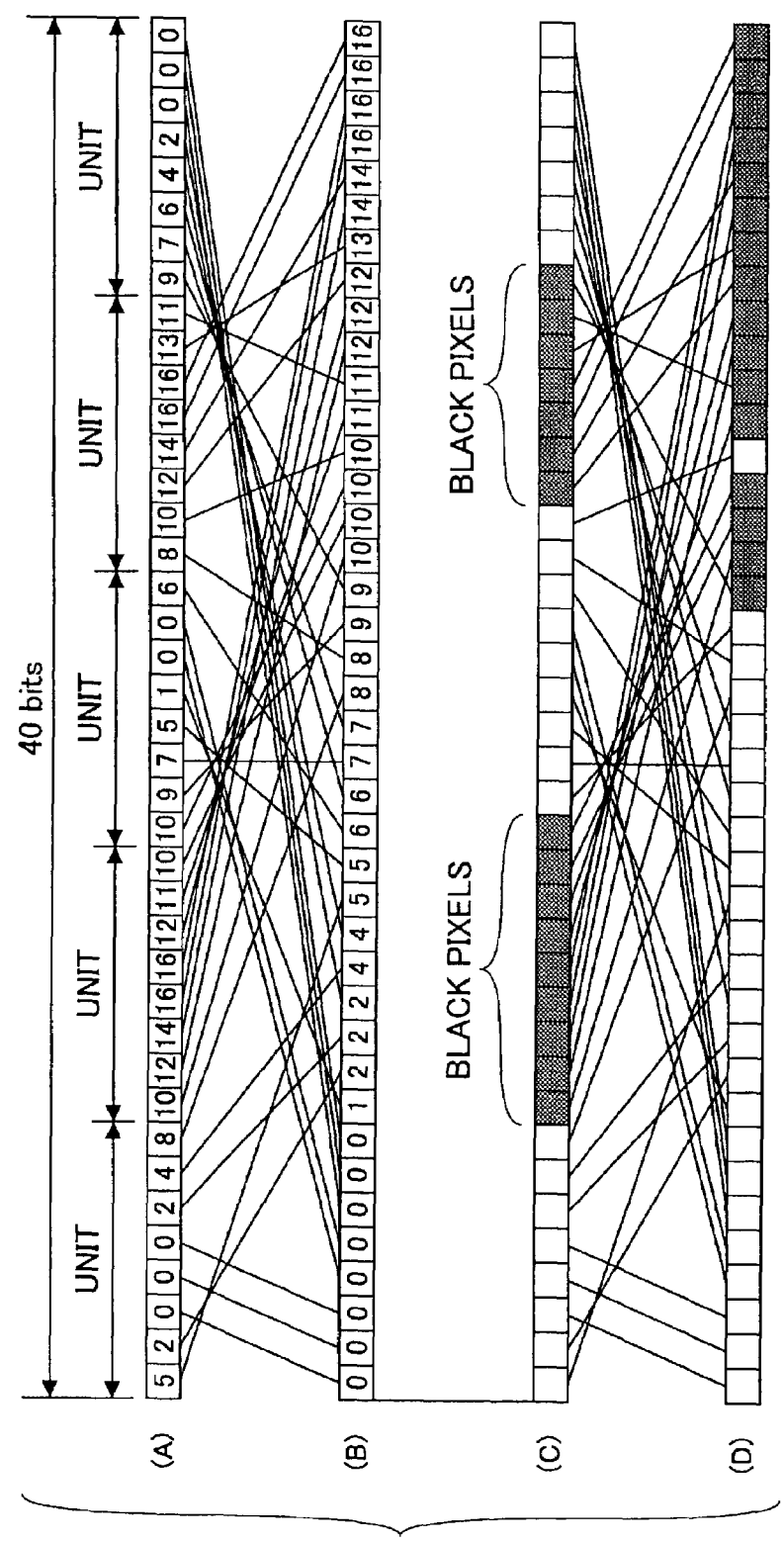
FIG. 5 is a diagram for explaining a process of determining pixels positions of units used in the first embodiment.

FIG. 5 is a diagram for explaining a process of determining pixels positions of units used in this first embodiment. Statistic information values of the units belonging to within one period will be described by assuming for the sake of convenience that one period amounts to 40 pixels. The statistic information value given to each pixel takes a value for each phase within one period of the image, as shown in FIG. 5(A). The statistic information value is determined by an originating probability indicating an ease of becoming a black pixel or a white pixel or, based on a changing probability indicating an ease with which the pixel value changes between adjacent periods. In the case shown in FIG. 5(A), statistic information values "0" through "16" are given to each of the pixels within one period, where one period amounts to 40 pixels. The statistic information values shown in FIG. 5(A) is determined based on the originating probability indicating a tendency of the ease of becoming the black pixel or the white pixel, and the larger the statistic information value the greater the ease of becoming the black pixel. Hence, the use of the statistic information value increases the possibility of consecutively obtaining the same values.

FIG. 5(B) shows a result of rearranging or sorting the statistic information values shown in FIG. 5(A) in a sequence based on size. Such an rearrangement on a 1:1 basis is made with respect to the actual image data, as shown in FIGS. 5(C) and 5(D). FIG. 5(C) shows the black pixels and white pixels in the actual image data having one period amounting to 40 pixels, and gray or shaded pixels denote the black pixels. FIG. 5(D) shows a result of rearranging or sorting the actual image data shown in FIG. 5(C) based on the originating probability, and it may be seen from FIG. 5(D) that the white pixels and the black pixels are respectively made to become consecutive. However, one white pixel is arranged between the two strings of consecutive black pixels in this particular case shown in FIG. 5(D), and this white pixel may be regarded as an error from the statistical point of view.

In the state shown in FIG. 5(D), the adjacent pixels are collected to form a unit. If one unit can be formed from pixels of the phases having a large bias in the originating probability such as the ease of becoming the black pixel or the white pixel, or formed from pixels of phases having a low changing probability such as virtually no change in values between adjacent periods, the units are more likely to have the same values consecutively. Compared to the case shown in FIG. 4(A) described above where the unit is formed from the adjacent pixels in the image space, the complexity slightly increases but a higher compression rate can be expected. By selecting the pixels forming the unit based on the originating probability or the changing probability, it is possible to increase the possibility of obtaining the same values consecutively, and the compression rate can be improved.

If the statistic information values described above are used as known fixed data and used in common for different kinds of images, the above described effect of improving the compression rate may not be obtained depending on the kind of image. In addition, even if different fixed data are used for each of the different kinds of images, the effect of improving the compression rate may not be obtained if regions having different properties coexist within the image. Hence, if the statistic information values are adaptively created from local regions of the image which is the compression target, it is possible to always and stably obtain the effect of improving the compression rate.

Figure 6:
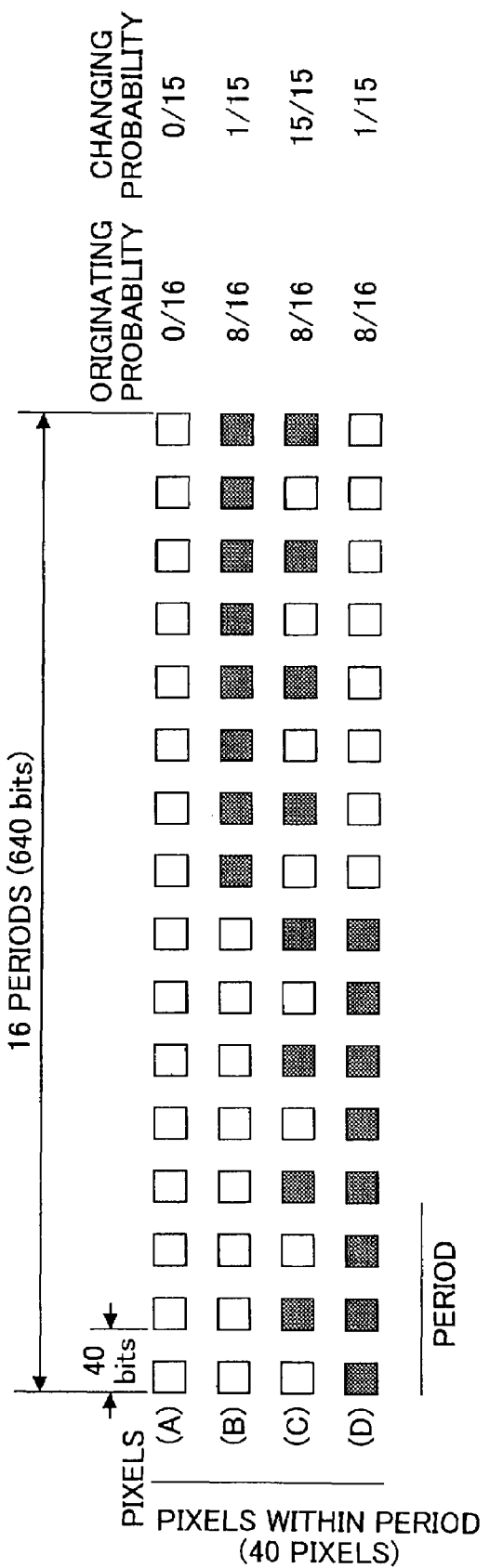
FIG. 6 is a diagram for explaining measured statistic information values used in the first embodiment.

FIG. 6 is a diagram for explaining measured statistic information values used in this first embodiment. FIG. 6 shows a case where the statistic information values are measured by obtaining the originating probability and the changing probability from the adjacent encoded image data. In FIG. 6, the ordinate indicates the phase of the pixels within one period (40 pixels), and the abscissa indicates the period from 1st to 16th periods. FIG. 6 shows a state where the statistic information values are measured from 16 pixels for every 40 pixels, by regarding as a learning region an encoded region (region amounting to 640 pixels) amounting to 16 periods and adjacent to the image data having the period of 40 pixels. Although only 4 phases (A), (B), (C) and (D) are shown in FIG. 6, similar measurements are actually made with respect to one period, that is, all of the 40 phases. First, the phase (A) in FIG. 6 has white pixels for all of the 16 periods, and is judged as a phase in which it is possible to always expect the same values to be consecutively obtained. When the phases (B) and (C) in FIG. 6 are compared, both have no bias in the originating probabilities, and are judged as phases in which it is not possible to expect the same values to be consecutively obtained. However, according to the changing probabilities, the phases (B) and (C) in FIG. 6 are judged as phases in which it is possible to expect the same values to be consecutively obtained.

However, if the phase (B) and the phase (D) shown in FIG. 6 form the same unit, the same values will not be obtained consecutively, and it is impossible to expect the same values to be consecutively obtained for the phase (B) shown in FIG. 6. Therefore, it may be regarded that an AND condition of the originating probability and the changing probability leads to a most correct judgement as to expectations of the same values to be obtained consecutively. But when the obtained effects are observed with respect to the troublesome operations of measuring both the originating probability and the changing probability, it may be regarded sufficient from the practical point of view to measure only one of the originating probability and the changing probability. The statistics section 10 shown in FIG. 2 carries out the measurement of the statistic information values and the determination of the unit structure based on the measured results.

Because the statistic information values are measured from the encoded learning region, the decoding can be carried out without storing the measured results. On the other hand, since the encoded learning region and the encoding target region which reflects the learning results to the unit structure are adjacent but independent regions, an appropriate unit structure cannot be obtained if the image features of the two regions are different. In a case where the features changes in only a small portion of the image, it may be regarded that the effect of the changing features on the compression rate is small. In addition, the effect of the adaptive processing on the processing speed may be regarded as being small. While the image data amounting to 16 periods are extracted from the buffer memory, the same statistic information values are used, and thus, the effect on the time consumed to carry out the rearranging conversion on a 1:1 basis due to updating of the statistic information values is small. Therefore, by creating the originating probability or the changing probability from the local region of the encoding target image, and adaptively selecting the pixels forming the unit based on the created originating probability or changing probability, it is possible to increase the possibility of obtaining the same values consecutively and to thereby improve the compression rate.

In the embodiment described above, one unit which is extracted is formed by 8 pixels, that is, a fixed number of pixels. However, units formed by different numbers of pixels may coexist in one period of the image, as described above in conjunction with FIG. 4(C). The number of pixels forming each unit is selected with reference to the statistic information values shown in FIG. 5(A), for example. A different encoding is carried out depending on whether or not the statistic information value exceeds a predetermined value. In the case shown in FIG. 4(C), the 16 pixels for which the same values less than or equal to the predetermined value can consecutively be expected form one unit, and other pixels form one unit by 8 pixels. Since the portion of one unit formed by 16 pixels is subjected to an encoding different from the encoding carried out with respect to the remaining portions, the use of one unit formed by 16 pixels does not considerably increase the circuit scale. In this case, compared to the unit structure shown in FIG. 4(A), the processing speed can be increased because 16 pixels can be encoded at one time. Therefore, by not limiting the number of pixels forming the units to a single fixed value and allowing units formed by different number of pixels to coexist, it is possible to increase the processing speed.

It is clear from the description given heretofore that, compared to the case where known fixed data are used for the statistic information values, it is possible to always and stably obtain the effect of improving the compression rate by adaptively creating the statistic information value from the local regions of the compressing target image. In other words, the statistic information values are measured based on the originating probability or the changing probability from the adjacent encoded image data, and the unit selection is made with reference to the measured statistic information values. Hence, the originating probability or the changing probability is created from the local regions of the encoding target image, and the number of pixels forming the unit is adaptively changed based on the created originating probability or changing probability.

Moreover, the pixels within the period may be used to form the unit, and the number of pixels may be set to a divisor of the period. If one period amounts to 40 pixels, the units may be formed by 2 pixels, 4 pixels, 8 pixels and 20 pixels, for example. Since the image data repeats based on the periodic property, the units may be sectioned for every divisor of the period, so as to increase the correlation of the units and improve the compression rate.

Next, a description will be given of the encoding section 12 shown in FIG. 2. It is assumed for the sake of convenience that the encoding section 12 carries out a Move-To-Front (MTF) process and a run-length process, and then carries out a Golomb-Rice encoding. First, the MTF process converts the unit data extracted by the unitizing section 11 into indexes of a dictionary which prestores symbols matching the unit data. For example, in the case of 8-bit input unit data, the dictionary has 256 indexes, and prestores the symbols of all 256 kinds of units. When the input unit data matches an index N of the dictionary, dictionary data corresponding to the index N is output from the dictionary. In addition, the matching dictionary data is moved to an index 0, and dictionary data corresponding to the indexes 0 through N−1 are respectively moved to the indexes which are one larger than before. As the process progresses, the frequently appearing dictionary data are gathered at locations in the dictionary having small index numbers, and thus, it is possible to convert the input unit data having an arbitrary distribution curve into output data which gradually decreases from a peak at 0.

The MTF process is in effect a process of outputting an indication as to which previously input symbols match the present input symbol. Accordingly, the MTF process is also referred to as a Bentley-Sleator-Tarjan-Wei (BSTW) encoding or a Recency Rank encoding.

Next, a run-length process is carried out with respect to the output data after the MTF process. The output data after the MTF process has a high originating probability for small values, and the possibility that the same values are consecutively obtained is high for small values. In this particular case, the run of consecutive "0"s is counted. For example, 4 events "0, 0, 0, 0" is converted into an 1 event "run4". Furthermore, an event integration for the run and the index is carried out with respect to a Golomb-Rice encoder which will be described later. For example, an input "0, 0, 0, 0, 3, 0, 0, 1, 5, 0, 2" is converted into 4 events "(run4, index3)", "(run2, index1)", "(run0, index5)" and "(run1, index2)".

Figure 7:
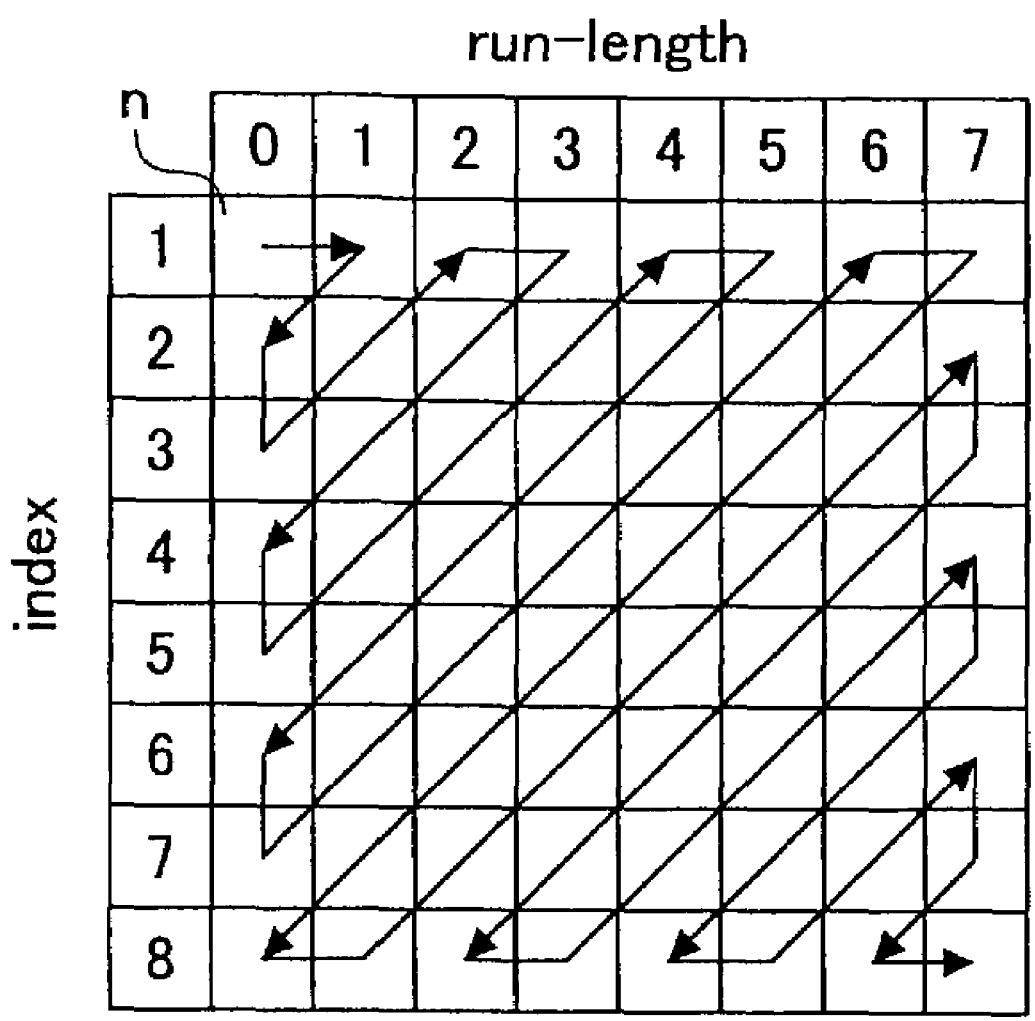
FIG. 7 is a diagram for explaining an event originating probability sequence.

FIG. 7 is a diagram for explaining an event originating probability sequence. In FIG. 7, the ordinate indicates the index, the abscissa indicates the run-length, and an intersection indicates an input data n of a Golomb-Rice code table shown in FIG. 8. FIG. 8 is a diagram showing a Golomb-Rice code table. A unique code is allocated with respect to each individual event. According to the Golomb-Rice code table shown in FIG. 8, different codes can be created according to parameters, namely, the order. Hence, it is possible to increase the encoding efficiency by selecting parameters appropriate for the distribution curve of the originating probability of the input data n. In addition, FIG. 7 shows the relationship of the event "(run_, index_)" and the input data n in the Golomb-Rice code table shown in FIG. 8. The input data n is numbered according to the originating probability sequence, with respect to all combinations of "(run_, index_)". Actually, run=0 to 15, and index=1 to 255, for example, and the input data n becomes 0 to 4079. But in the case shown in FIG. 7, run=0 to 7 and index=1 to 8 for the sake of convenience. The encoding section 12 is not limited to that described above, and other encoding means may be used in the present invention. It is also possible to use a single encoding means or a combination of various encoding means, so as to improve the compression rate.

Figure 9:
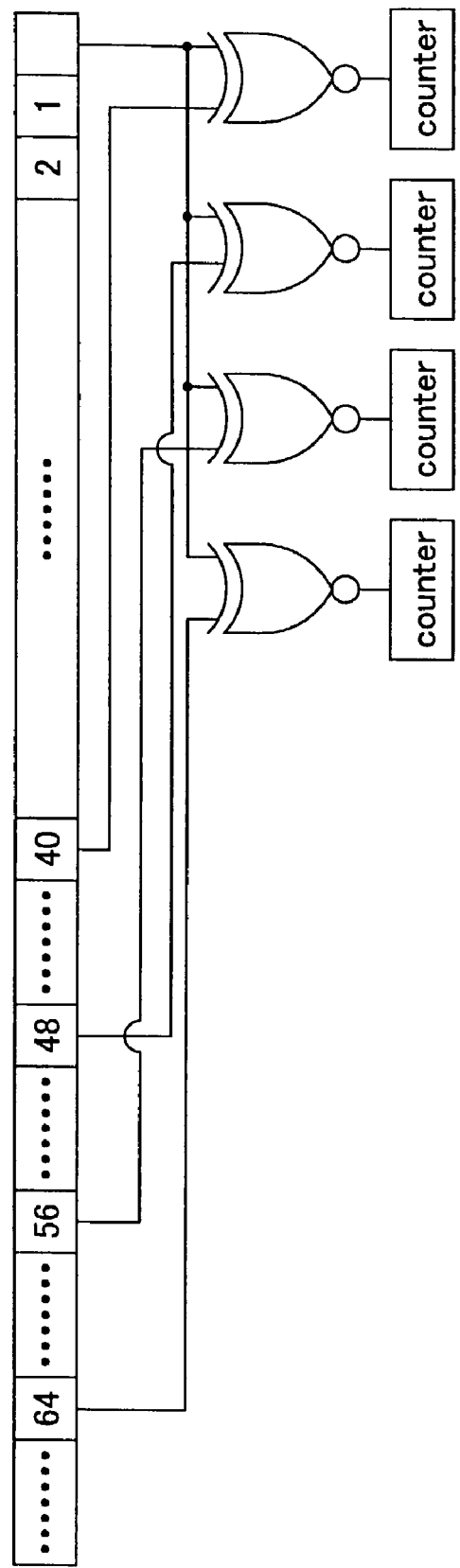
FIG. 9 is a diagram for explaining an image period detecting circuit.

FIG. 9 is a diagram for explaining an image period detecting circuit. The period of the image, amounting to 40 pixels, was assumed to be known in the description given heretofore. However, it is possible to adaptively detect the period of the image from the encoding target image using the image period detecting circuit shown in FIG. 9. In FIG. 9, only 4 kinds of typical image periods are detected. An exclusive-NOR (XNOR) circuit which obtains an exclusive-NOR of 2 pixels which are separated by a number of pixels indicating the image period is moved 1 pixel at a time for a predetermined distance, and a counter adds the result of the XNOR operation every time the XNOR circuit is moved. A maximum counted value of the counter is detected as the image period. Although the image period is one-dimensional in this case, the present invention is not limited to a case where the image period is one-dimensional. In other words, the unit which is extracted may be a rectangular region made up of a plurality of pixels in the horizontal direction and amounting to one period and a plurality of pixels in the vertical direction. Furthermore, the encoding target image is not limited to the binary dither image, and the encoding can be carried out similarly to any image having the periodic property, such as a multilevel dither image. The binary dither image is obtained when a result of a dither process with respect to the image becomes 0 or 1, that is, 1 bit. On the other hand, the multilevel dither image is obtained when a result of a dither process with respect to the image becomes N bits, where $2 \leq N$.

Figure 1C:
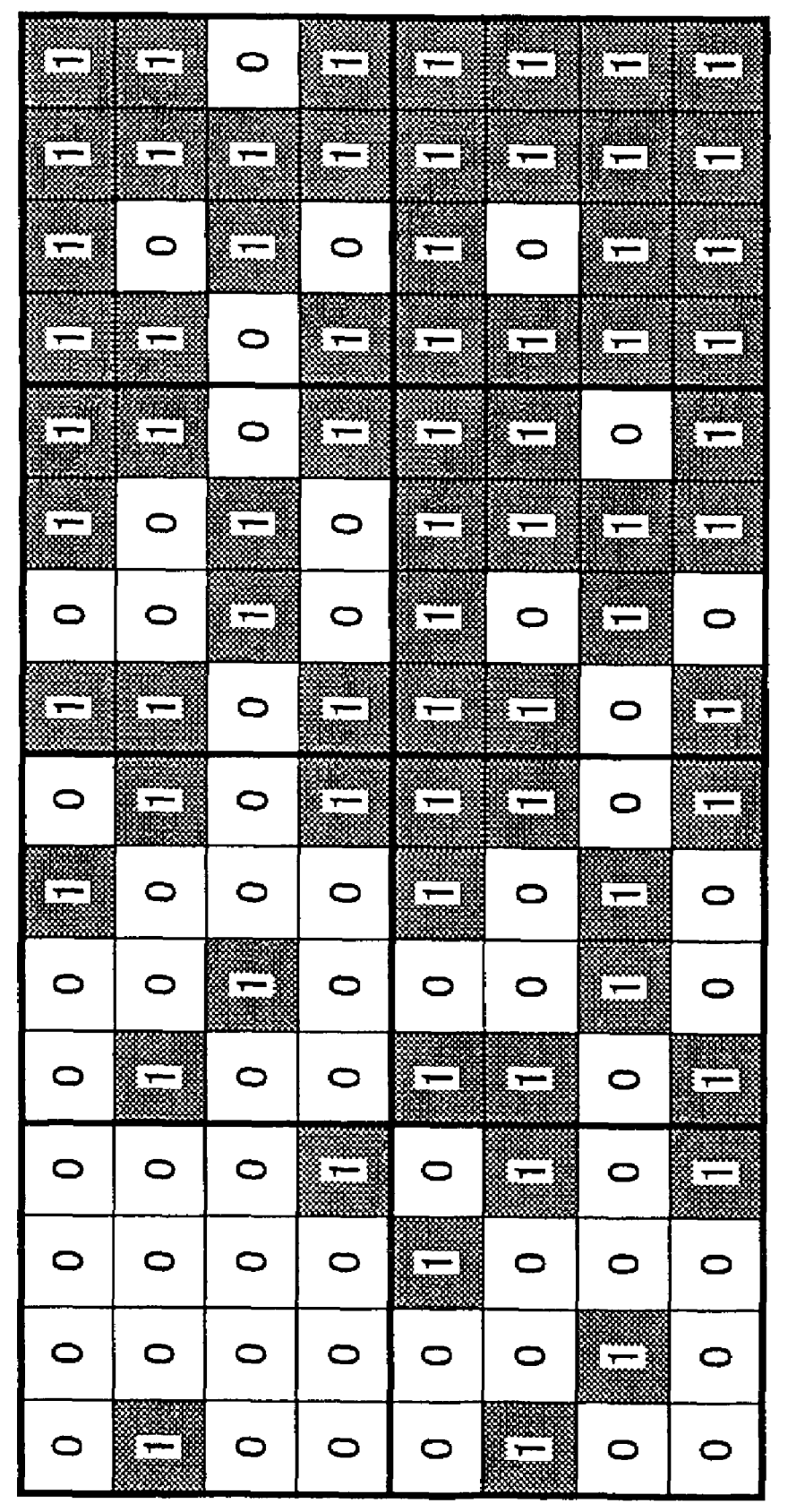
Figure 10:
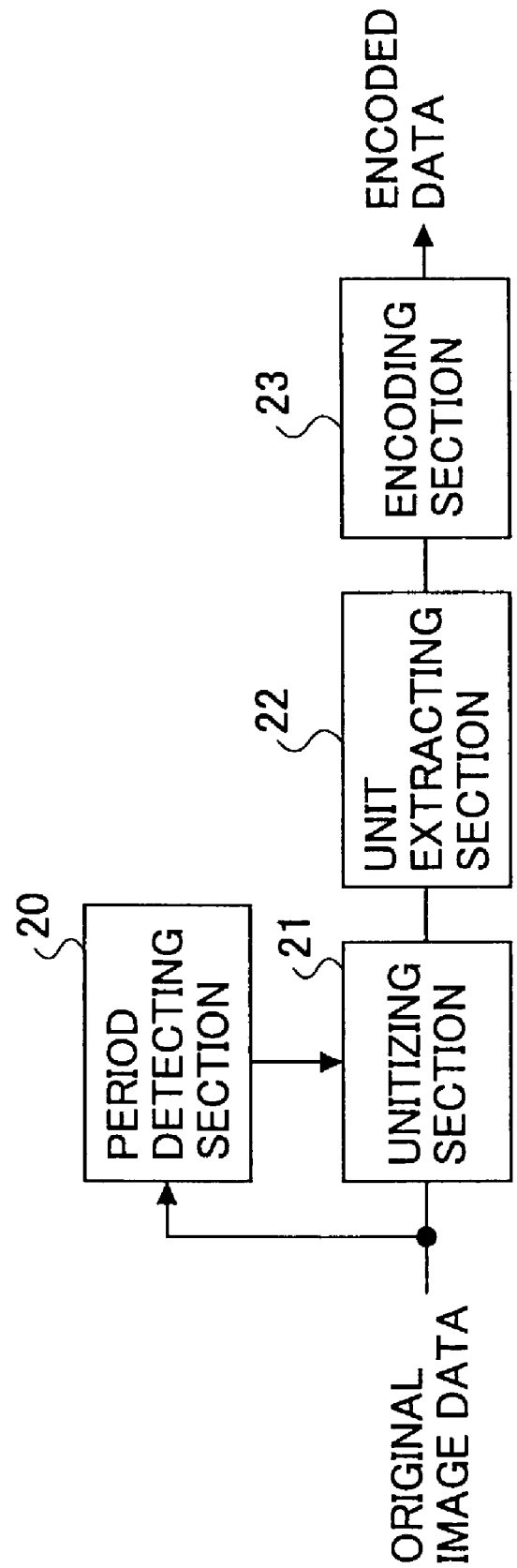
FIG. 10 is a system block diagram showing a second embodiment of the image encoding apparatus according to the present invention.

FIG. 10 is a system block diagram showing a second embodiment of the image encoding apparatus according to the present invention. The image encoding apparatus shown in FIG. 10 includes a period detecting section 20, a unitizing section 21, a unit extracting section 22, and an encoding section 23. The original image data which is input to the image encoding apparatus represents each pixel by a plurality of bits, and the original image data has some kind of periodic property. For example, the original image data is already subjected to a gradation process such as a dither process or, is already subjected to a block encoding or the like and has a data sequence in conformance with a predetermined format. For the sake of convenience, it is assumed that the original image data is already subjected to the dither process using the systematic dither method described above in conjunction with FIGS. 1A through 1C, and that the original image data has a periodic property and is represented by 1 bit/pixel.

The unitizing unit 21 extracts the units of encoding by gathering a plurality of pixels to form each unit. The number of pixels forming the unit is determined based on the period of the image data. Since the size of the dither matrix used is known, the period of the image may be supplied to the unitizing section 21 in the form of a parameter indicating the dither matrix size. Alternatively, the period of the image may be automatically detected by the period detecting section 20 and supplied to the unitizing section 21.

Figure 11:
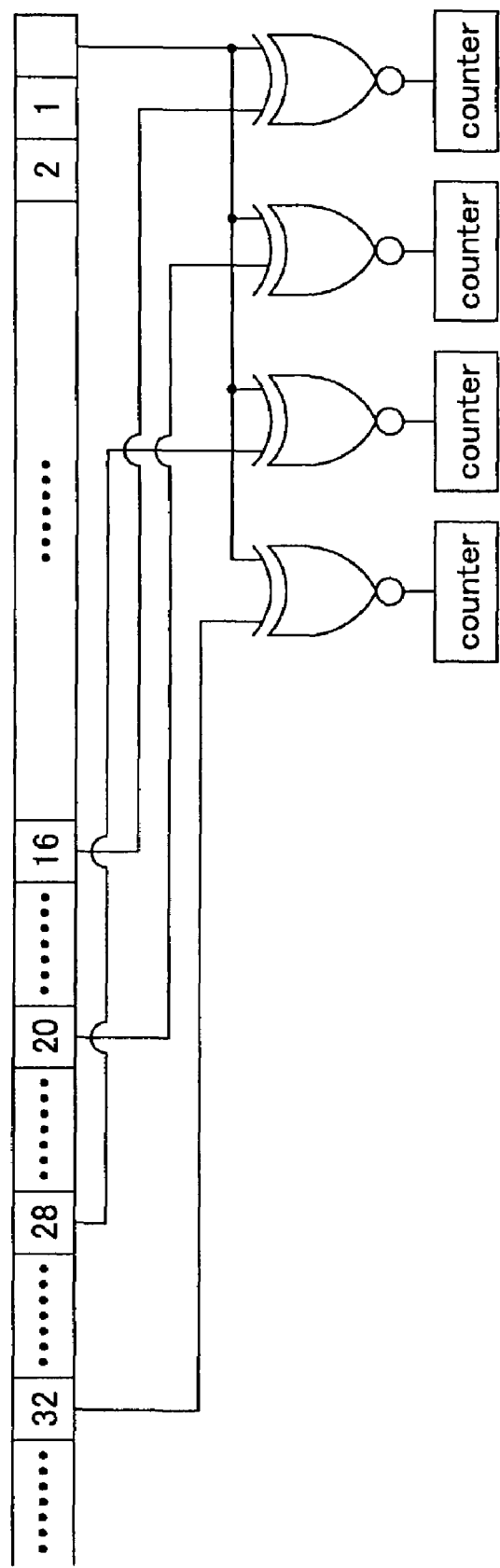
FIG. 11 is a diagram for explaining a period detecting section.

FIG. 11 is a diagram for explaining the period detecting section 20. N finite dither periods (16, 20, 28 and 32 in this particular case) are determined in advance, and attention is drawn to the values of the pixels which are separated by the respective periods from the target pixel. The exclusive-NOR circuit, similarly to the exclusive-NOR circuit shown in FIG. 9, is shifted one pixel at a time as shown in FIG. 11, and a counter adds the result of the XNOR operation every time the XNOR circuit is shifted. Of the N kinds of dither periods, the dither period having the largest counted value, that is, the dither period having the most stable data (data which does not change), is detected as the dither period of the image. By automatically detecting the period of the image in this manner, it is possible to appropriately cope with an image in which a plurality of dither periods coexist. Because the unit size changes when the dither period changes, it is necessary to add to the code a predetermined bit which indicates this change. The unitizing means 21 extracts the units from the original image data based on the period which is obtained in the above described manner.

Figure 12A:
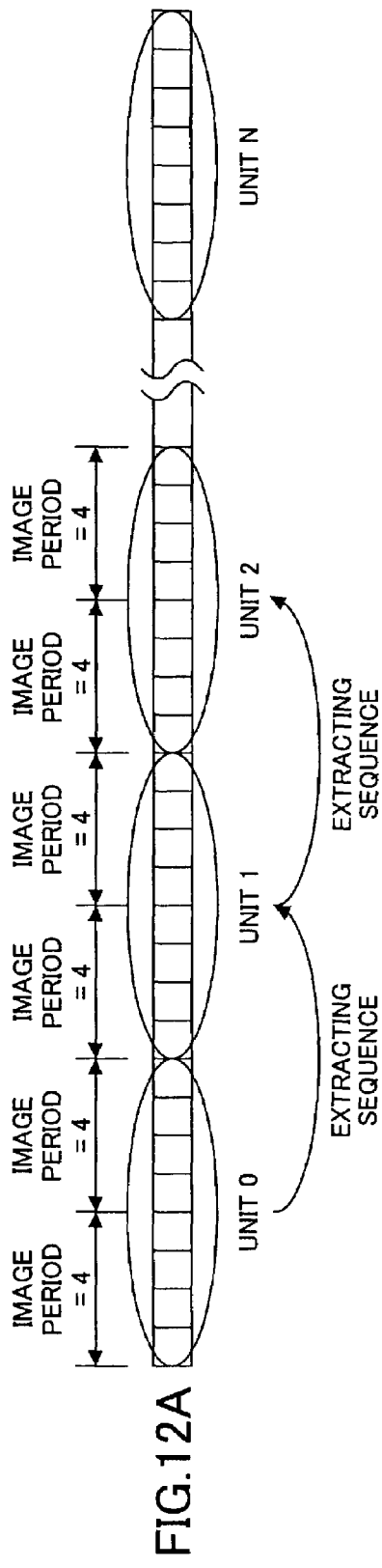
FIGS. 12A and 12B are diagrams for explaining an extracting method which determines the unit structure and the coding sequence.
Figure 12B:
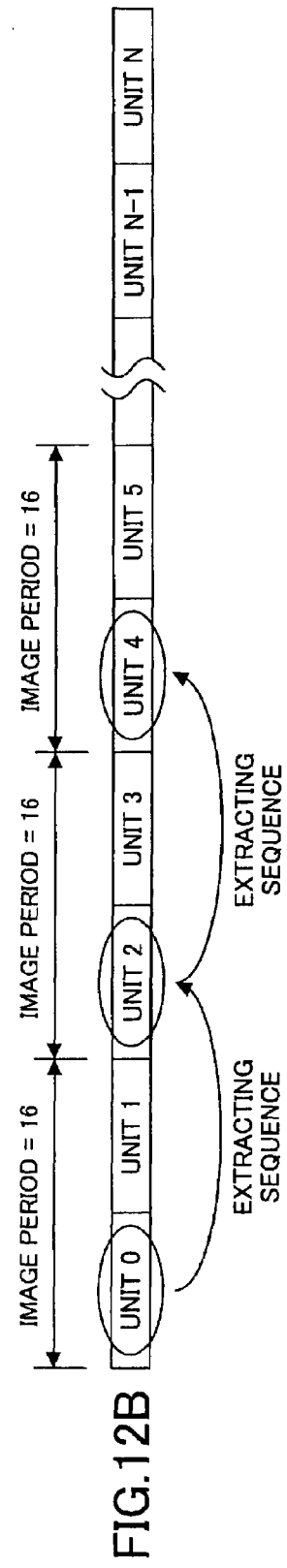

FIGS. 12A and 12B are diagrams for explaining an extracting method which determines the unit structure and the coding sequence. FIG. 12A shows a case where the period of the image is small, that is, the period is made up of a small number of pixels. In this case, it is desirable to set the unit of encoding to a size (number of pixels) amounting to M times the period, where M is a natural number. This is because, when considering to increase the speed of the encoding process, the total number of encoding targets can be reduced by making up one unit of encoding by a plurality of pixels which is as large as possible, and the encoding speed can be increased, to thereby improve the compression rate. In this particular case, one unit is formed by 8 pixels corresponding to M=2, based on the parameter indicating that the period is "4". Of course, M may be any natural number such as M=3, but if the natural number M is excessively large, the number of kinds of units which are generated becomes large, to deteriorate the encoding efficiency.

FIG. 12B shows a case where the where the period of the image is large, that is, the period is made up of a large number of pixels. In this case, the unit of encoding is set to 1/M times the period, where M is a natural number. Since the period is made up of 16 pixels in this particular case, when M=2, one unit of encoding is made up of 8 pixels which is ½ times the period. Similarly to the case shown in FIG. 12A, if the natural number M is excessively large, the size of one unit becomes too small, to prevent a high-speed encoding process. Therefore, when creating the unit of encoding, it is possible to selectively set the unit to M times or 1/M times the period, depending on the processing unit. The decoding can be carried out by switching to the one block unit of the processing unit, and adding a predetermined judging bit. Although the unit size is 8 pixels in FIGS. 12A and 12B, the unit size may be set arbitrarily to 16 or 32 pixels, for example. The unit size may be appropriately selected to a plurality of pixels which improves the encoding efficiency from the practical point of view.

After the method of creating the unit of encoding is determined as described above, the unit extracting section 22 extracts the units based on the encoding sequence. FIG. 12A shows a case where the units are successively extracted, and this case will be referred to as a "1-phase". On the other hand, FIG. 12B shows a case where every other units are extracted, and this case will be referred to as a "2-phase". The extraction of the units is completed for every block which is the processing unit. When extracting every other units, the units are extracted starting from the first unit 0, and after extracting the last unit N−1 of the block, the units are then extracted starting from the skipped adjacent unit 1 until the last unit N is extracted. The block size which is the processing unit of the encoding may be 1 line, for example, and may be set arbitrarily to less than 1 line or to 1 page, for example.

The object of extracting the units is to improve the encoding efficiency, and to make the same values or approximately same values consecutive. This object can be achieved by extracting the units using the periodic property of the image. The extracted units are encoded by the encoding section 23. The compression efficiency can further be improved by a Move-To-Front method or the like, for example, using a dictionary. The Move-To-Front method converts the generated values into the indexes of the dictionary. The dictionary is of an updating type which is updated while registering the present value to the front of the dictionary. Accordingly, it is possible to make a conversion into data which is distributed about the index 0. The compression efficiency is further improved using the run-length method, for example, and the converted data is encoded by the Huffmann coding or the like.

Figure 13:
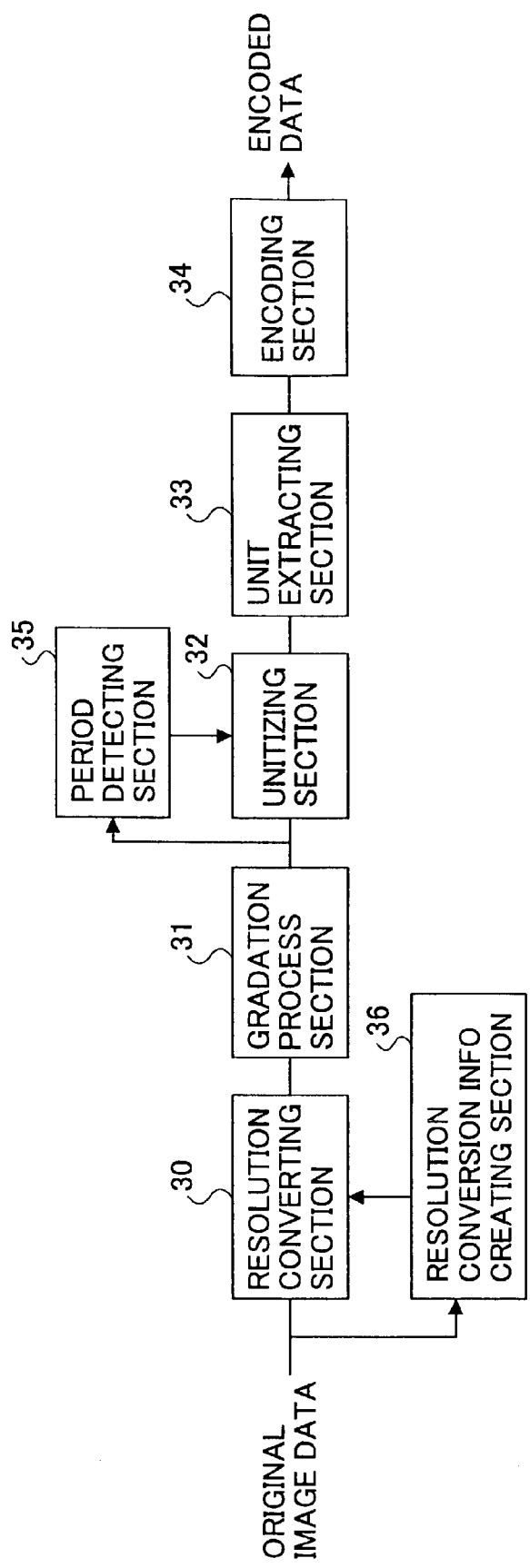
FIG. 13 is a system block diagram showing a third embodiment of the image encoding apparatus according to the present invention.

FIG. 13 is a system block diagram showing a third embodiment of the image encoding apparatus according to the present invention. The image encoding apparatus shown in FIG. 13 includes a resolution converting section 30, a gradation processing section 31, a unitizing section 32, a unit extracting section 33, an encoding section 34, a period detecting section 35, and a resolution conversion information creating section 36. In this embodiment, it is assumed for the sake of convenience that the original image data is formed by 8 bits/pixel. The original image data may be input from various kinds of input means, including image data input from a digital camera, and data written in page description language (PDL) by an application or the like of a personal computer, and the original image data may be created at an arbitrary resolution. When outputting the original image data to an output means such as a printer having an arbitrary resolution, the resolution conversion information creating section 36 calculates a magnification for magnifying 1 pixel of the original image data to n pixels based on the resolutions of the input means and the output means, in a printer driver which is installed in the personal computer. The resolution converting section 30 uses the calculated magnification to enlarge or reduce the original image data and develop the original image data into a bit-map. For example, the original image data is enlarged using a most adjacent pixel replacing method or the like. After the magnification, the gradation processing section 31 carries out a dither process using the systematic dither method, similarly to the dither process described above in conjunction with FIG. 10, except that the unit extracting section 33 determines the unit extracting method using the magnification calculated by the resolution conversion information creating section 36.

Figure 14:
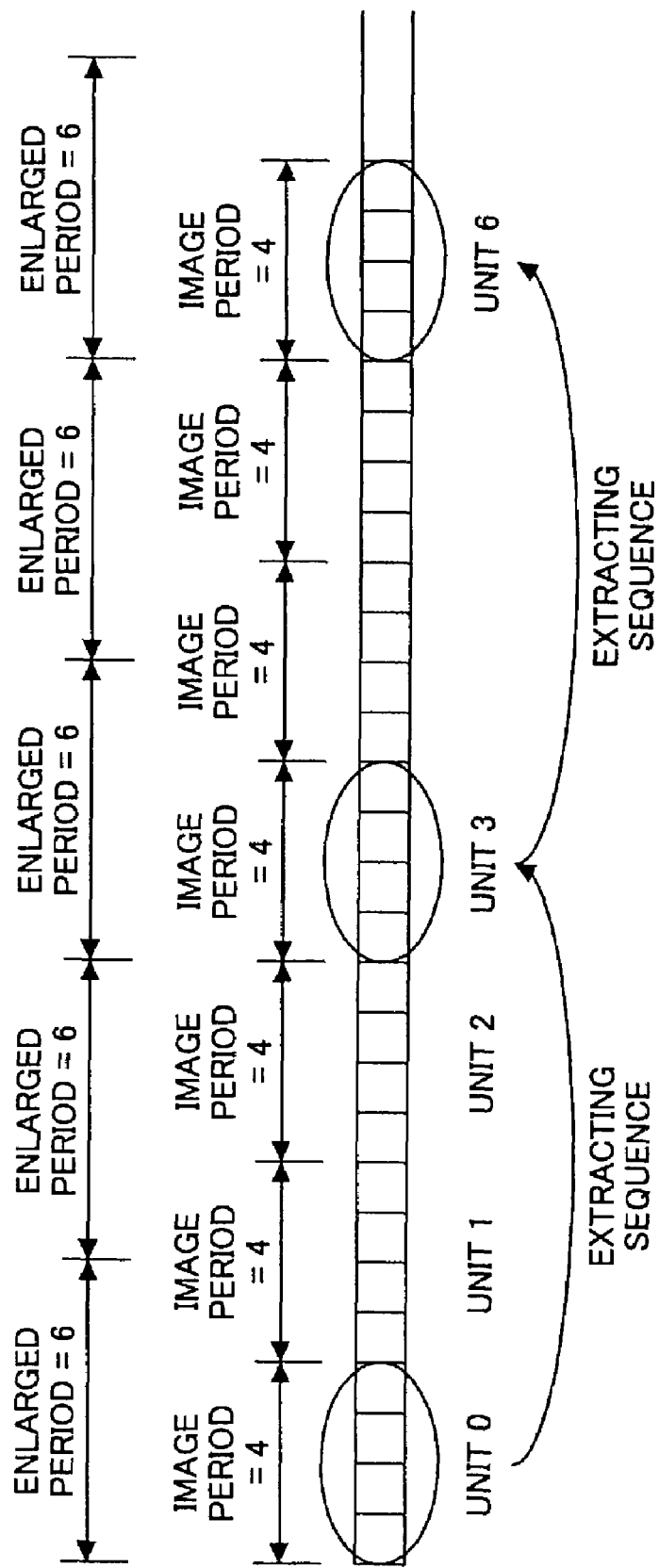
FIG. 14 is a diagram for explaining a unit extracting method of the third embodiment.

FIG. 14 is a diagram for explaining a unit extracting method of this third embodiment. It is assumed for the sake of convenience that the magnification obtained by the resolution conversion information creating section 36 is "6", that is, information indicating that 1 pixel is enlarged to 6 pixels. In this case, the image after the magnification is represented by data having the same values for 6 pixels in a direction X and for 6 pixels in a direction Y. Hence, the enlarging period is "6". The gradation processing section 31 carries out the dither process with respect to the magnified image, and the period detecting section 35 automatically detects the period of the original image data based on the magnified image. Of course, the dither matrix size may be known and used for the period of the original image data. It is assumed in FIG. 14 that the image period is "4", and that the unit is set to one times the image period, that is, one unit is made up of 4 pixels. A least common multiple of the image period and the enlarging period is 12 pixels. In other words, the twelfth pixel position is a suitable position from the point of view of both the image period and the enlarging period. Using this pixel position, the units are extracted for every two units, that is, every third unit is extracted, as shown in FIG. 14. In this case, the number of phases of the units is 3 (3-phase). Using also the enlarging period in this manner, it is possible to make similar units consecutive with a higher accuracy compared to the case where only the image period is used, to thereby enable the encoding efficiency to be improved.

When the least common multiple described above exceeds a predetermined threshold value Th which is a natural number, it is possible to limit the distance between the extracted units. For example, when the enlarging period is 19 pixels, the image period is 20 pixels and the unit size is 20 pixels, the least common multiple becomes 380, which means making consecutive two units which are separated by 380 pixels. As the distance between two pixels in the direction X increases, the correlation of the two pixels deteriorate. For this reason, when the separation of the two consecutively extracted units is large, it is unlikely that the two consecutively extracted units have similar values, and the compression efficiency may be deteriorated by making successive the two units having no similarities or virtually no similarities. Hence, the distance between the extracted units is limited so that the threshold value Th is 100, for example. In this case, since the image period is 20 pixels, every fifth unit is extracted and the number of phases of the units is 5 (5-phase). Although the enlarging period cannot be used in this case, it may be regarded that the use of the enlarging period may adversely affect the compression efficiency in this particular case, and it may be regarded that the use of the image period alone is more effective in improving the compression efficiency. Alternatively, although the unit size is 20 pixels in the above described case, it is of course possible to set the unit size to ½ the size, namely, 10 pixels, so as to reduce the least common multiple with the magnification. The least common multiple in this case does not becomes less than or equal to the threshold value Th, but is still effective depending on the situation.

Figure 15:
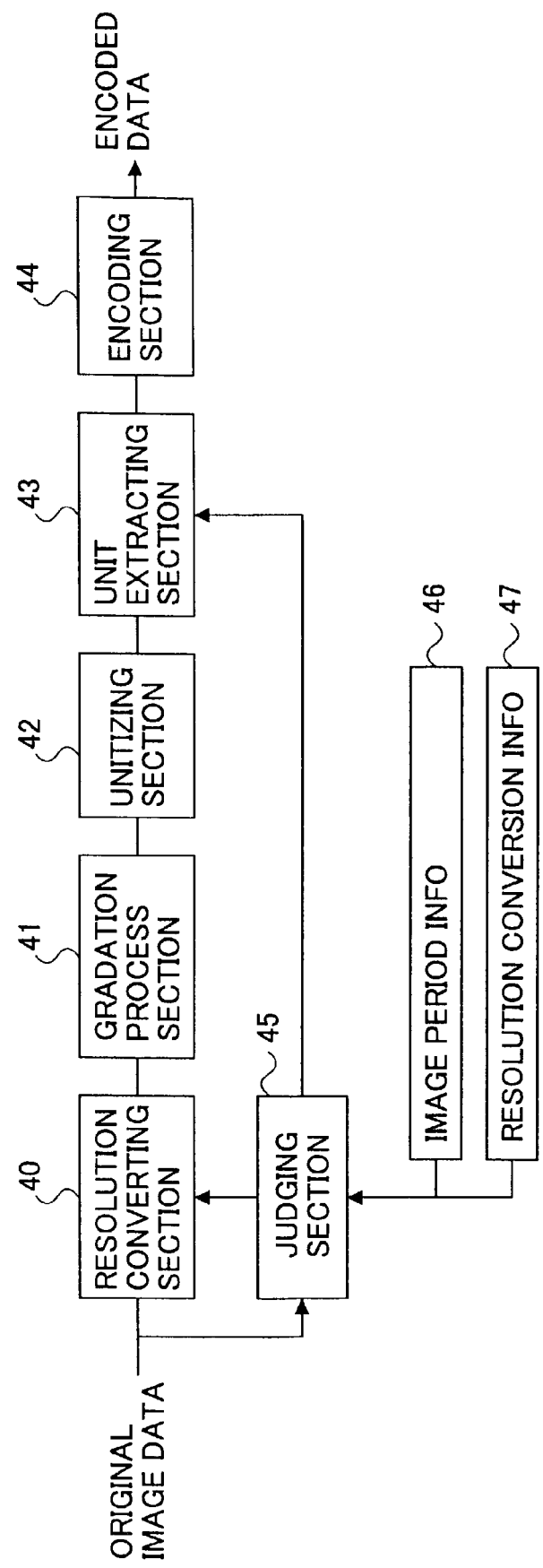
FIG. 15 is a system block diagram showing a fourth embodiment of the image encoding apparatus according to the present invention.

FIG. 15 is a system block diagram showing a fourth embodiment of the image encoding apparatus according to the present invention. The image encoding apparatus shown in FIG. 15 includes a resolution converting section 40, a gradation processing section 41, a unitizing section 42, a unit extracting section 43, an encoding section 44, and a judging section 45. Image period information 46 and resolution conversion information 47 are supplied to the judging section 45. In this embodiment, the period of the image, such as the dither matrix size, is known in advance. The image period may be detected using the period detecting section 35 shown in FIG. 13. But in this case, it may become necessary to carry out the resolution conversion itself over again. However, in the case of an image in which a plurality of dither matrixes coexist, the accuracy of the encoding improves. This fourth embodiment differs from the third embodiment shown in FIG. 13 in that the judging section 45 carries out a judgement based on the image period information (dither matrix size and the like) 46 and the resolution conversion information 47, and the resolution conversion method used in the resolution conversion section 40 is switched depending on the judgement result.

For example, in a case where the image period is 18 pixels and the enlarging period is 16 pixels, the difference between the two periods is 2 pixels. The judging section 45 sets a predetermined threshold value Ti, which is a natural number, with respect to the difference of 2 pixels, and sets the judging condition to switch the resolution conversion method used in the resolution converting section 40 when the difference is less than or equal to Ti=5. In this particular case, this judging condition is satisfied because the difference is 2 pixels, and thus, the resolution conversion method is switched to a method different from that used normally. Alternatively, in the case where the image period is 8 pixels and the enlarging period is 18 pixels, it is desirable to judge the image period as being 16 pixels which is twice the actual image period, because the difference between the two periods is considerably large. By providing the threshold value Ti, it is possible to suppress deterioration of the image quality when the enlarging method is changed. However, if the threshold value Ti is set too large, the error may also become large to deteriorate the enlarged image.

FIGS. 16A and 16B are diagrams for explaining an enlarging process of a resolution conversion. More particularly, this enlarging process carries out the enlarging based on an enlarging period of 16 pixels, because the image period is 16 pixels. FIG. 16A shows the normal enlarging process in which 1 pixel is enlarged to 18 pixels, and A, B, C, . . . denote pixel values. FIG. 16B shows the enlarging process which carries out the enlarging based on the enlarging period of 16 pixels. Since an error amounting to 2 pixels is generated in the enlarged image for 1 pixel of the original image data, it is necessary to absorb this error somewhere. At a time when a pixel value E1 shown in FIG. 16B is processed, an error amounting to 10 pixels is generated compared to the normal enlarging process shown in FIG. 16A. A condition is set so as to absorb this error when this error becomes greater than or equal to a predetermined threshold value Tj which is a natural number. In this particular case, the error is absorbed at the pixel values E1 and E2. Actually, the magnification differs at these portions, and the threshold value Tj must be set in a range which does not introduce problems when viewed by the human eyes, and the error absorbing method must also be determined. Of course, the resolution conversion method is not limited to that described above, and an arbitrary resolution conversion method may be used instead.

FIG. 17 is a flow chart for explaining a first embodiment of the image encoding process. A step S1 sets a number of pixels corresponding to the period of the image data, within the encoding target digital image data having the periodic property. For example, the number of pixels set in the step S1 is 40 pixels as shown in FIG. 3 according to the size of the dither matrix. Next, a step S2 successively extracts a plurality of pixels within one period (40 pixels), so as to form one unit by 8 pixels as shown in FIG. 3, for example. Of course, the number of pixels forming one unit is not limited to 8 pixels and may be set to a number to suit the features of the image data. For example, in a case where the period of the image data is 40 pixels, one unit may be formed by 2, 4, 8 or 20 pixels which are divisors of the number of pixels forming one period. By setting the number of pixels forming one unit to a divisor of the number of pixels forming one period of the image data, it is possible to increase the correlation of the units, and improved compression efficiency can be expected.

A step S3 outputs the units which are formed in the step S2, in a sequence such that a unit separated by the 40 pixels set in the step S1 is output next to each pixel. This is because the number of pixels is set according to the period of the dither image and the data of two units separated by 40 pixels have a high possibility of taking the same values. Consequently, the data of the units having the same values can be encoded consecutively, and a high compression rate can be expected.

Furthermore, a step S4 carries out an encoding process with respect to the data of the units. This encoding process carries out the Move-To-Front (MTF) process and the run-length process, and thereafter carries out the Golomb-Rice encoding with respect to the combination of the MTF process and the run-length process.

Figure 18:
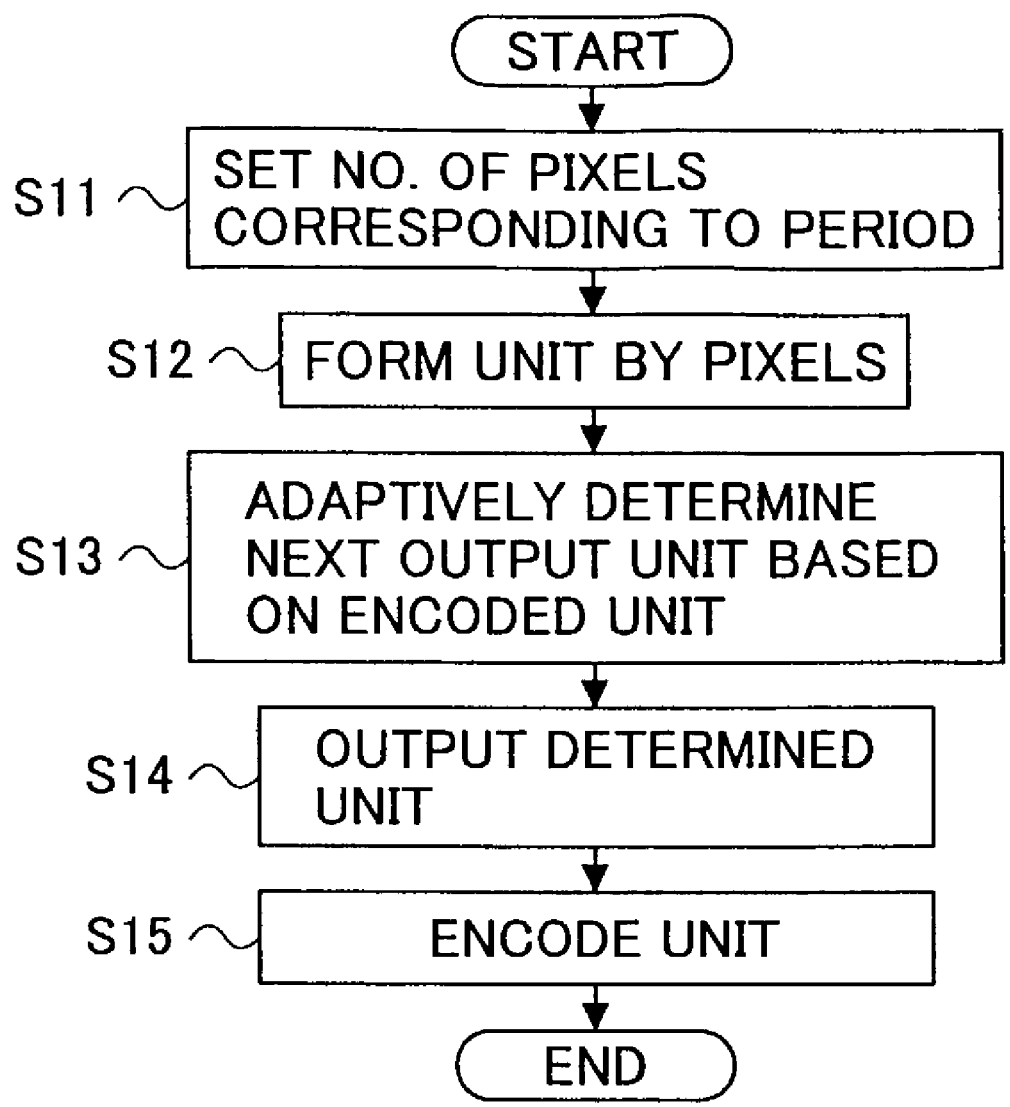
FIG. 18 is a flow chart for explaining a second embodiment of the image encoding process.

FIG. 18 is a flow chart for explaining a second embodiment of the image encoding process according to the present invention. The image encoding process shown in FIG. 17 utilizes the low-frequency component of the original image data. However, the image encoding process shown in FIG. 18 uses a prediction method to increase the consecutiveness of the same values of the data of the units, and adaptively separates the units by an integer multiple of the period so as to determine the unit which is to be output next. Even if the units are separated, it is possible to increase the possibility of consecutively obtaining the same values by extracting the units having close tones and making such units consecutive.

A step S11 sets a number of pixels corresponding to the period of the image data, within the encoding target digital image data having the periodic property. For example, the number of pixels set in the step S11 is 40 pixels as in the case of the image encoding apparatus shown in FIG. 10. Next, a step S12 extracts a plurality of pixels within one period (40 pixels), so as to form one unit. Next, a step S13 predicts which units have the close tones, based on the data of the adjacent units which are already encoded. For example, the number of black pixels of the encoded units is counted, and the units are extracted in a sequence from the unit having the largest counted value for the black pixels. By using the prediction method and adaptively separating the units by an integer multiple of the period to determine the unit which is to be output next, it is possible to increase the consecutiveness of the same values of the data of the units which are output.

After the unit formed by the step S12, a step S14 outputs the next unit which is determined based on the extracting sequence which is determined by the step S13. A step S15 carries out the encoding process with respect to the data of the units, similarly to the encoding section 23 shown in FIG. 10. For example, this encoding process carries out the Move-To-Front (MTF) process and the run-length process, and thereafter carries out the Golomb-Rice encoding with respect to the combination of the MTF process and the run-length process. However, the encoding process itself carried out in the step S15 is not limited to such an encoding process.

As described above, the number of pixels forming one unit is not limited to 8. For example, the unit may be formed by collecting pixels having similar statistic information values based on the originating probability or the changing probability described above. In addition, the pixels forming the unit do not necessarily need to be adjacent pixels, and the pixels may be rearranged based on the statistic information values so as to increase the possibility of consecutively obtaining the same values. However, the pixels forming each unit belong to within one period of the image data.

Figure 19:
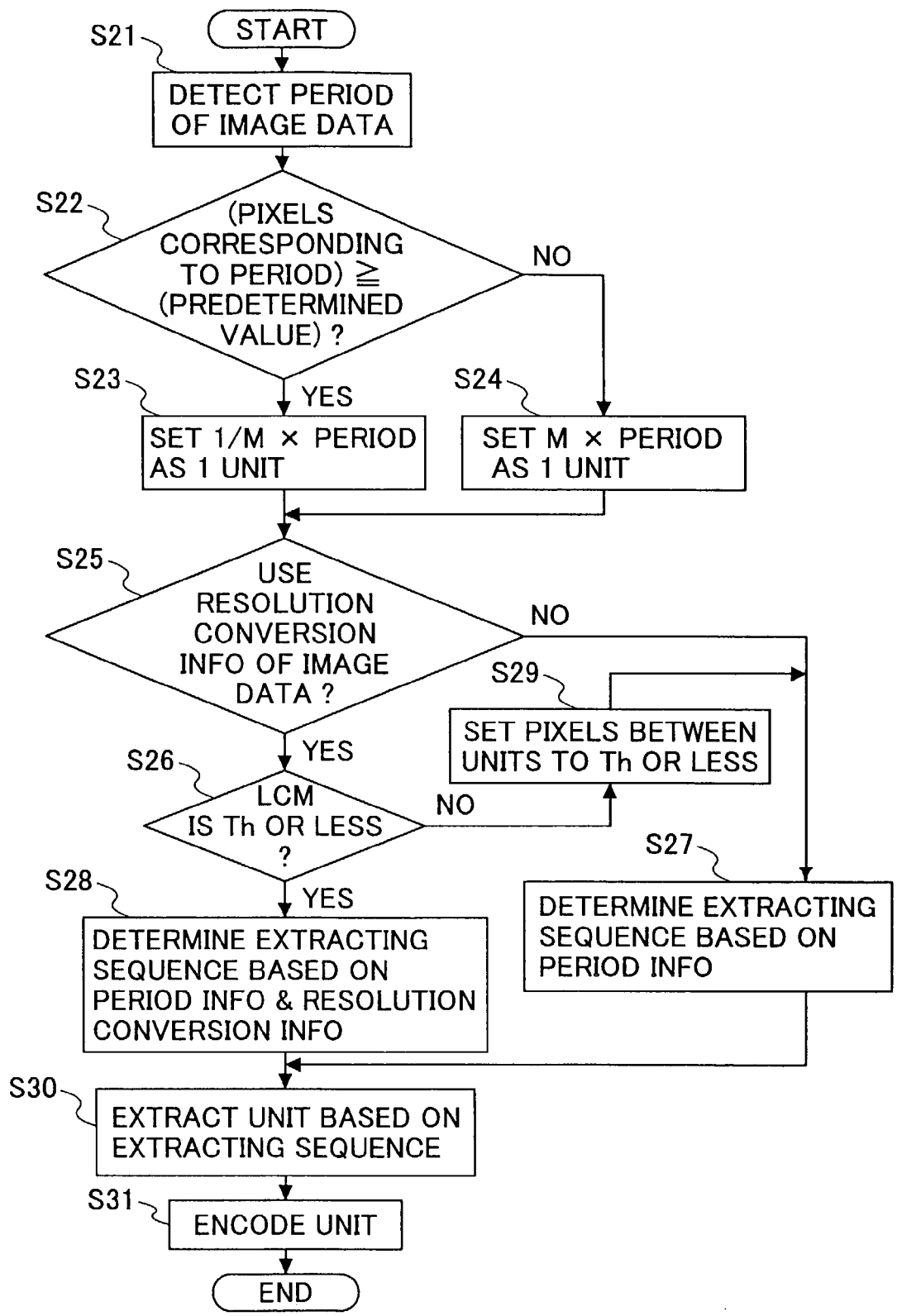
FIG. 19 is a flow chart for explaining a third embodiment of the image encoding process.

FIG. 19 is a flow chart for explaining a third embodiment of the image encoding process. A step S21 detects the period of the image data. In a case where the dither matrix size is known, the period can be detected from the dither matrix size. Alternatively, the period can be automatically detected by the period detecting section 35 shown in FIG. 13. A step S22 decides whether or not the number of pixels corresponding to the detected period is greater than or equal to a predetermine value. If the decision result in the step S22 is YES, a step S23 sets 1/M times the period as one unit. For example, if the predetermined value is set to "8" and the image data has a period amounting to 16 pixels, one unit is formed by ½ times the period, that is, 8 pixels. On the other hand, if the decision result in the step S22 is NO, a step S24 sets M times the period as one unit. For example, if the predetermined value is set to "8" and the image data has a period amounting to 4 pixels, one unit is formed by 2 times the period, that is, 8 pixels. The unit of encoding can be set depending on the period, to a number of pixels which enables an efficient compression from the practical point of view.

After the step S23 or S24, a step S25 decides whether or not to use the resolution conversion information including the magnification at the time when the resolution conversion is carried out with respect to the image data. If the decision result in the step S25 is YES, the encoding sequence is determined using both the number of consecutive pixels having the same values which are generated by the magnification of the resolution conversion (hereinafter referred to as an enlarging period) and the image period generated by the dither process or the like. More particularly, a step S26 decides whether or not a least common multiple of the enlarging period and the image period is less than or equal to a threshold value Th. If the decision result in the step S26 is YES, a step S28 determines the extracting sequence based on the period information (image period) and the resolution conversion information (enlarging period). On the other hand, if the decision result in the step S25 is NO, a step S27 determines the extracting sequence based solely on the period information, and the process advances to a step S30.

If the decision result in the step S26 is NO, a step S29 sets the number of pixels between two units to the threshold value Th or less, and the process advances to the step S27 so as to determine the extracting sequence based solely on the period information of the image period, without using the enlarging period. By changing the unit size based on the image period and reducing the least common multiple of the image period and the enlarging period, there are cases where this process is effective even when the number of pixels between the two units is greater than or equal to the threshold value. Next, the step S30 extracts the units based on the determined extracting sequence. Furthermore, a step S31 carries out the Move-To-Front (MTF) process and the run-length process, and thereafter carries out the Golomb-Rice encoding with respect to the combination of the MTF process and the run-length process.

Figure 20:
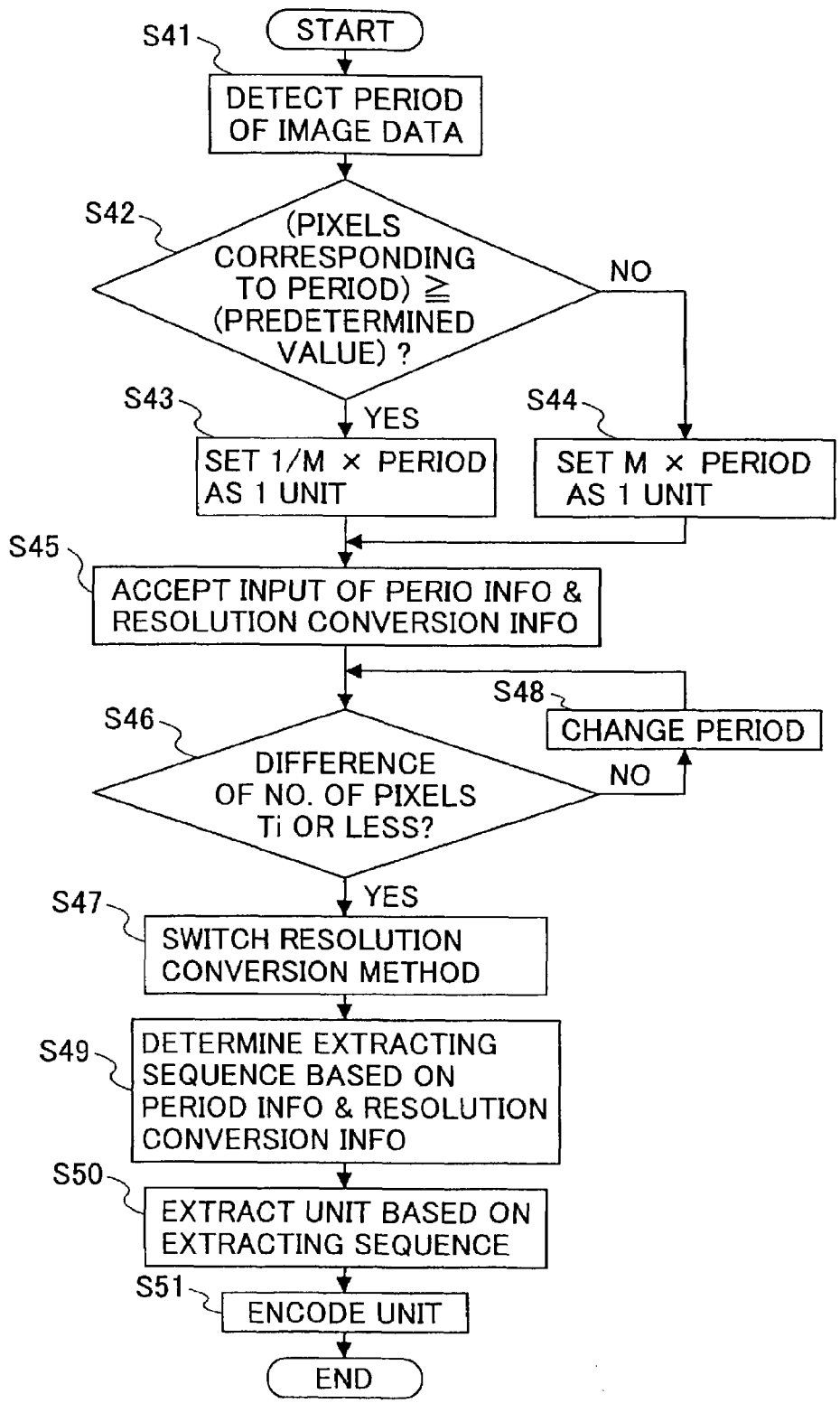
FIG. 20 is a flow chart for explaining a fourth embodiment of the image encoding process.

FIG. 20 is a flow chart for explaining a fourth embodiment of the image encoding process. A step S41 detects the period of the image data. In a case where the dither matrix size is known, the period can be detected from the dither matrix size. Alternatively, the period can be automatically detected by the period detecting section 35 shown in FIG. 13. A step S42 decides whether or not the number of pixels corresponding to the detected period is greater than or equal to a predetermine value. If the decision result in the step S42 is YES, a step S43 sets 1/M times the period as one unit. For example, if the predetermined value is set to "8" and the image data has a period amounting to 16 pixels, one unit is formed by ½ times the period, that is, 8 pixels. On the other hand, if the decision result in the step S42 is NO, a step S44 sets M times the period as one unit. For example, if the predetermined value is set to "8" and the image data has a period amounting to 4 pixels, one unit is formed by 2 times the period, that is, 8 pixels. The unit of encoding can be set depending on the period, to a number of pixels which enables an efficient compression from the practical point of view.

After the step S43 or S44, a step S45 accepts input of the period information related to the period of the image data and the resolution conversion information including the magnification at the time of the resolution conversion. The encoding sequence is determined using both the number of consecutive pixels having the same values which are generated by the magnification of the resolution conversion (hereinafter referred to as an enlarging period) and the image period generated by the dither process or the like. More particularly, a step S46 decides whether or not a difference between the number of pixels of the enlarging period and the number of pixels of the image period is less than or equal to a threshold value Ti. If the decision result in the step S46 is YES, a step S47 switches the resolution conversion method and carries out the resolution conversion by a method other than the normal resolution conversion method. In addition, a step S49 determines the extracting sequence based on the period information (image period) and the resolution conversion information (enlarging period). On the other hand, if the decision result in the step S46 is NO, a step S48 changes the image period, and the process returns to the step S46. For example, in a case where the image period is 8 pixels and the enlarging period is 18 pixels, the difference between the image period and the enlarging period is large. Hence, in such a case, the step S48 changes the image period to two times the number of pixels, namely, 16 pixels, because the resulting difference between the image period and the enlarging period becomes small and desirable for making the judgement.

Next, a step S50 extracts the units based on the extracting sequence determined by the step S49. In addition, a step S51 carries out the Move-To-Front (MTF) process and the run-length process, and thereafter carries out the Golomb-Rice encoding with respect to the combination of the MTF process and the run-length process.

For example, an encoding method for a dither image is proposed in a Japanese Laid-Open Patent Application No. 57-181270. According to this proposed encoding method, in the case of a combination of patterns which can be predicted to have a high frequency of being generated, a mode code indicating the pattern combination and a number of times the mode code continues are sent. In addition, in the case of a pattern combination which can be predicted to have a low frequency of being generated, such as when a run of white or black continues for a time longer than the dither period, a run-length code is sent. This proposed encoding method is effective in improving the compression rate if the pattern combination which is predicted to have a high frequency of being generated is actually generated frequently. However, the compression rate cannot be improved with respect to the pattern combination which is predicted to have a low frequency of being generated, that is, with respect to patterns which are not registered. In addition, because the mode code is determined in advance for each pattern combination, it is not always the case that a shortest code is allocated to the pattern combination which is generated most frequently.

Recently, the resolution of the images treated in fields such as scanners, printers and digital cameras has become very high, and as a result, the amount of data per image or, the number of pixels (pixel data), has become extremely large. Accordingly, there are demands to efficiently transfer the extremely large amount of data via networks, and to efficiently compress the data with a high processing speed and a high compression rate suited for storing the data in storage media such as hard disks and memories.

Next, a description will be given of embodiments which are aimed at satisfying such demands. In other words, an object of the embodiments described hereunder is to improve the processing speed by preparing all pattern combinations (symbols) which can be predicted for the dither image or the like, allocating a short code for the pattern combination having a high frequency of generation in the region which is presently being processed within the image by a table updating type dictionary, and setting a plurality of pixels in the units which are combined.

More particularly, the objects of the embodiments described hereunder include:
(a) gathering a plurality of pixels and encoding the gathered pixels to realize a high-speed encoding process, and to encode the image with a high compression efficiency using a table updating type dictionary;
(b) setting symbols which are registered as initial values of the dictionary to symbols matching the features of the input image data, so as to aggregate the output values of the dictionary and to carry out the encoding with a high compression efficiency;
(c) statistically determining the symbols which are registered as the initial values of the dictionary, so as to carry out the encoding with a high compression efficiency;
(d) changing the position where the unit is formed based on a parameter, so as to aggregate the patterns generated and to carry out the encoding with a high compression efficiency;
(e) learning and determining the parameter from the input image data, so as to carry out the encoding with a high compression efficiency for various images;
(f) using the period of the input image data so as to efficiently obtain the parameter;
(g) completing the unit within the period of the input image data, and creating units having similar patterns in each period, so as to aggregate the patterns generated and to carry out the encoding with a high compression efficiency;
(h) learning the period of the input image data from the input image data, and carry out the encoding with a high compression efficiency for various images;
(i) forming one unit from a plurality of pixels, and carrying out the encoding with respect to an index of the dictionary corresponding to the unit, so as to carry out the encoding process at a high speed;
(j) further using the run-length encoding, so as to reduce the number of symbols generated, and to carry out the encoding process at a high speed; and
(k) outputting a run-length output and an index output of the dictionary in pairs, so as to further reduce the number of symbols generated, and to carry out the encoding process with a high compression efficiency.

Figure 21:
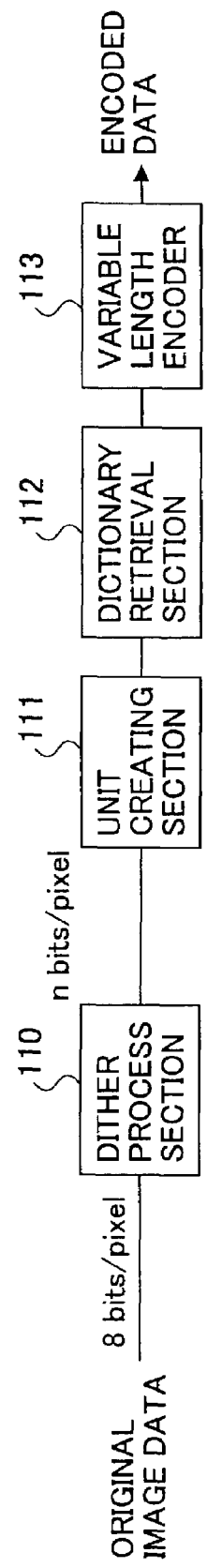
FIG. 21 is a system block diagram showing a fifth embodiment of the image encoding apparatus according to the present invention.

FIG. 21 is a system block diagram showing a fifth embodiment of the image encoding apparatus according to the present invention. The image encoding apparatus shown in FIG. 21 includes a dither processing section 110, a unit creating section 111, a dictionary retrieval section 112, and a variable length encoder 213.

FIG. 22 is a diagram showing a dither matrix used in this fifth embodiment. A dither matrix 101 shown in FIG. 22 has a matrix size of 20 pixels by 20 pixels. A pixel value from 0 to 255 is given to each pixel of the dither matrix 101. For example, the image data made up of 8 bits/pixel is converted into n bits/pixel by the dither processing section 110 based on the dither matrix 101 shown in FIG. 22. In this particular case, it is assumed for the sake of convenience that the converted image data has 1 bit/pixel. Then, the unit creating section 111 collects a plurality of pixels to create one unit.

Figures 23A, 23B:
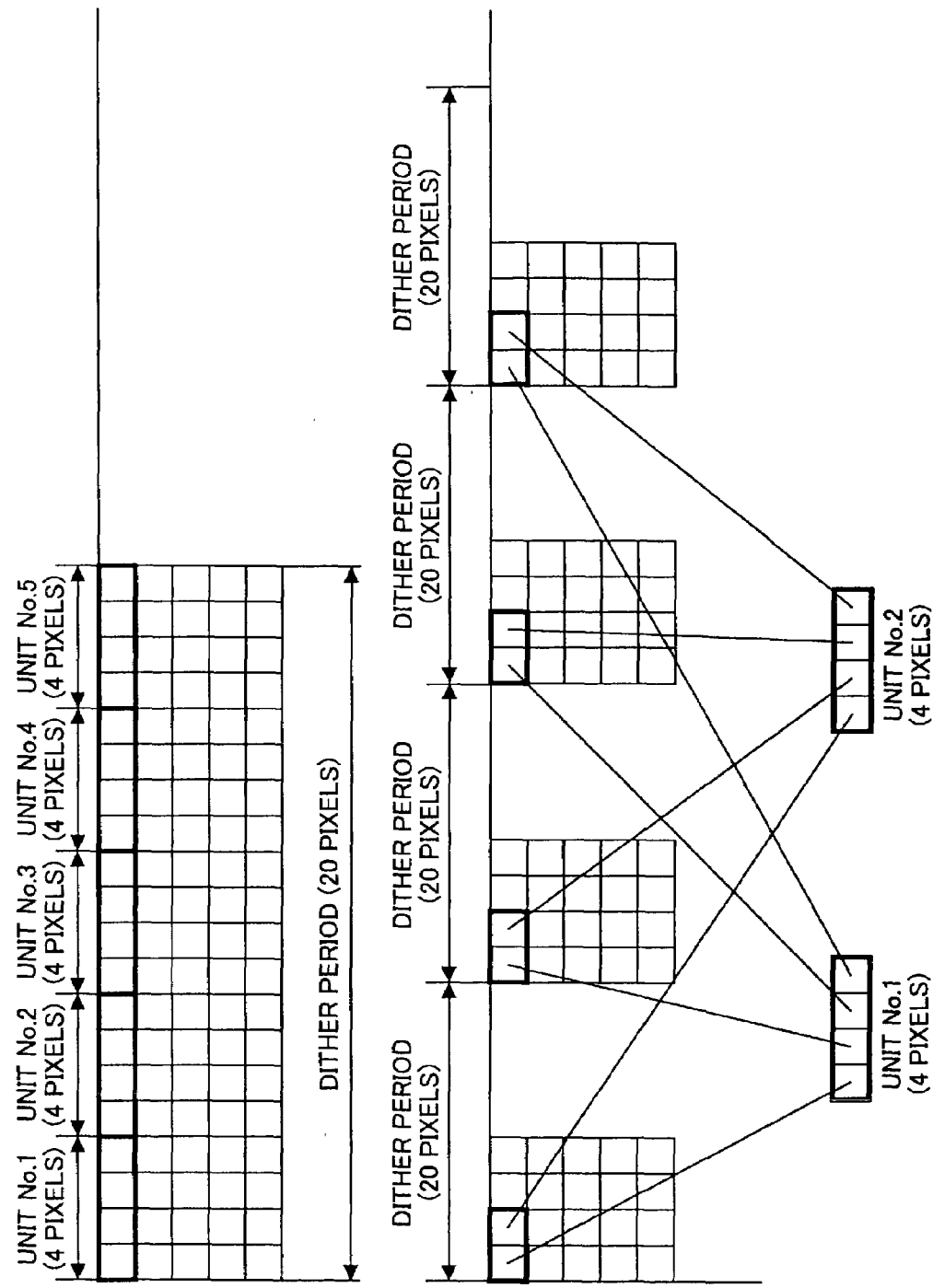
FIGS. 23A and 23B are diagrams for explaining a unit creating process of the fifth embodiment.

FIGS. 23A and 23B are diagrams for explaining a unit creating process of this fifth embodiment. It is assumed for the sake of convenience that the dither matrix 101 shown in FIG. 22 having a period amounting to 20 pixels is applied to the input image data. FIG. 23A shows a case where the unit is formed by collecting the pixels within the dither period (20 pixels in this case). FIG. 23B shows a case where the unit is formed by collecting the pixels for every dither period amounting to 20 pixels. The unit may be formed by an arbitrary number of pixels. But in this particular case, one unit is formed by 4 pixels, and the units are successively created by regarding 4 pixels from the start, that is, 4 bits, as one unit. It is not essential to form one unit by 4 pixels which are adjacent. For example, 4 pixels or 8 pixels may be selected arbitrarily within the dither period so as to form one unit.

Next, a modeling process using the dictionary is carried out by the dictionary retrieval section 112. In this embodiment, the dictionary employs a Bentley-Sleator-Tarjan-Wei (BSTW) algorithm which is proposed in a U.S. Pat. No. 4,796,003. The BSTW algorithm is a kind of universal coding which carries out modeling of an information source using the dictionary. The BSTW algorithm shares the dictionary (memory, array or table) of the symbols included in the input sequence for the encoding and the decoding. According to this encoding system, the index of the dictionary where the input symbol exists is subjected to a variable length encoding, and at the same time, the input symbol is moved to the beginning of the dictionary to update the dictionary.

Accordingly, as the input symbols continue to be moved to the beginning of the dictionary, the frequently appearing symbols become located at the beginning portion of the dictionary, and the appearing probability of the dictionary indexes having small values become high. Hence, even if the originating probability of each symbol is not known beforehand, the data compression can be made by subjecting the index to the variable length encoding using the Huffmann code or the like. The variable length encoder 113 shown in FIG. 21 carries out the variable length encoding using the Huffmann code. Of course, the encoding means is not limited to the variable length encoder 113.

In the dictionary retrieval section 112 shown in FIG. 21, it is necessary to set the dictionaries (symbols) as the initial values of the dictionary table. For example, in a case where the data in units of 4 bits are input to the dictionary retrieval section 112, it is generally the case that the initial value is set so that the index and the dictionary content have the same value, such as a dictionary "0" for an index "0", a dictionary "1" for an index "1", . . . , and a dictionary "15" for an index "15". However, in the case of such dictionaries, a considerable interval from the start of the image will correspond to a learning period of the dictionary, and outputs are not aggregated and various values are output. In other words, the compression efficiency is poor during the interval corresponding to the learning period of the dictionary.

Figures 24A, 24B:
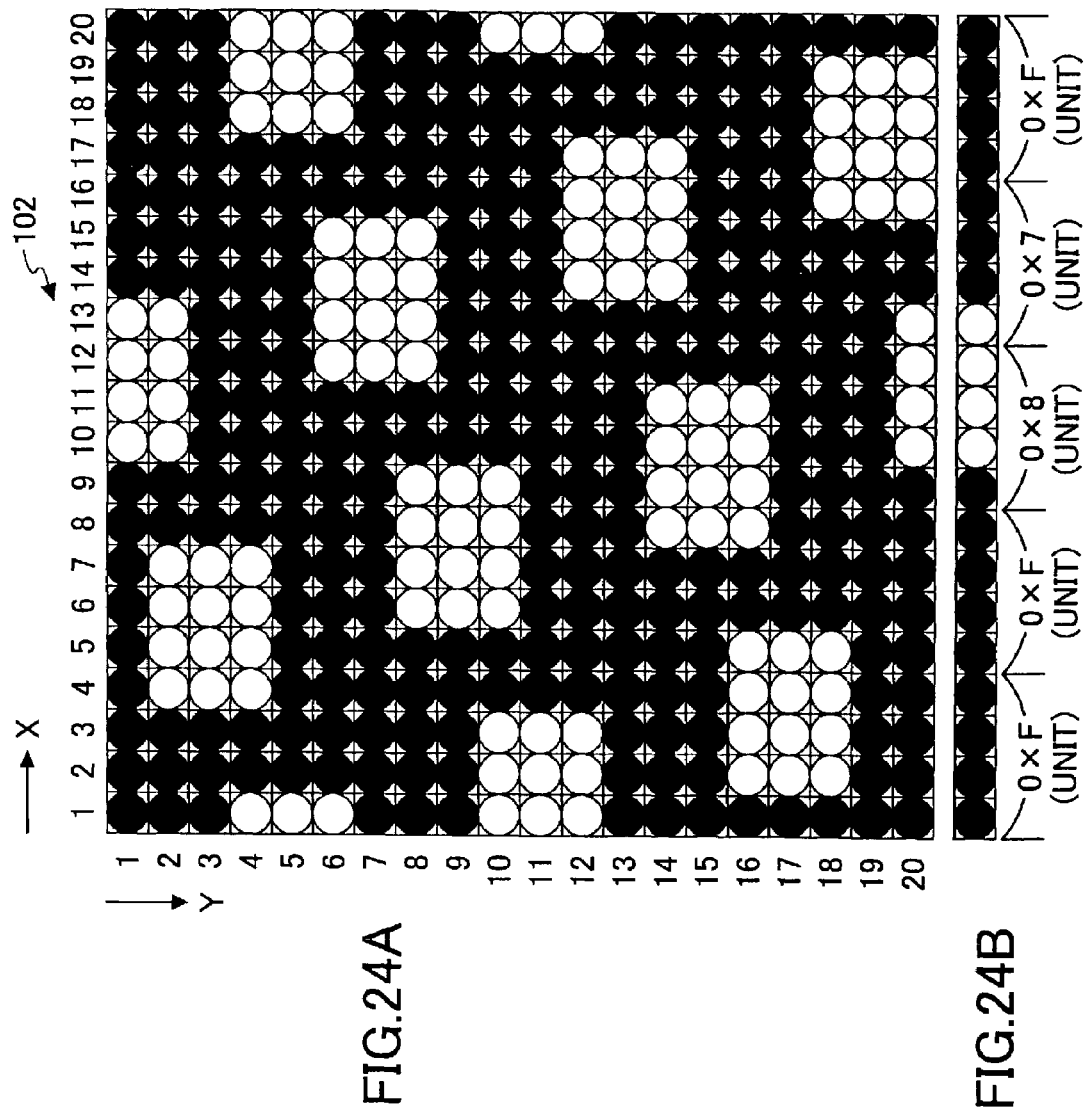
FIGS. 24A and 24B are diagrams for explaining the image data applied with the dither matrix shown in FIG. 22.

FIGS. 24A and 24B are diagrams for explaining the image data applied with the dither matrix 101 shown in FIG. 22. FIG. 24A shows an image data 102 which has been subjected to the dither process using the dither matrix 101. FIGS. 25A and 25B are diagrams showing dictionaries corresponding to the indexes. In order to efficiently carry out the compression from the start of the image, the dictionary having a high appearing frequency is set in advance to the index of a high level as the initial value of the dictionary. For example, it is known in this particular case that the input image has been subjected to the dither process using the dither matrix 101 shown in FIG. 22.

When the dither matrix 101 is applied to the image data having pixel values which are all 128, the image data 102 shown in FIG. 24A is obtained. The units of the first line are respectively made up of 4 pixels as shown in FIG. 24B, and these units respectively have values 0xF, 0xF, 0x8, 0x7, 0xF, . . . When the "dictionary 1" is normally set for the dictionary corresponding to the "index" shown in FIG. 25A based on the statistics for one line or N lines, the dictionaries such as the "dictionary 2" shown in FIG. 25B having a high frequency of generation are set in a sequence starting from that with the highest frequency to the indexes having high levels. For example, a variable length encoding such as the Golomb-Rice encoding is used to successively allocate short codes in a sequence starting from the index having the highest level. In the particular case shown in FIG. 25B, the dictionaries F, 8 and 7 having the high frequency of generation are set in a sequence from the index having the highest level, and the shorter codes are allocated from the indexes having the higher levels.

In this embodiment, the dictionary is dependent on the input image which is subjected to the dither process or the like in advance. For this reason, it is possible to output an index having a small value from the start of the image, and the compression can be carried out efficiently. However, since the initial values which are set are dependent on the dither matrix 101 which is assumed to be used, the initial values become meaningless if the input image has been subjected to a dither process using other dither matrixes.

Figure 26:
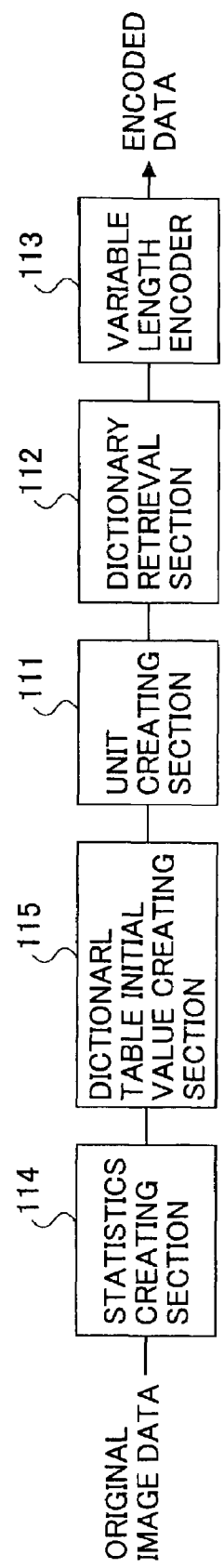
FIG. 26 is a system block diagram showing a sixth embodiment of the image encoding apparatus according to the present invention.

FIG. 26 is a system block diagram showing a sixth embodiment of the image encoding apparatus according to the present invention. In FIG. 26, those parts which are the same as those corresponding parts in FIG. 21 are designated by the same reference numerals, and a description thereof will be omitted. The image encoding apparatus shown in FIG. 26 includes a statistics creating section 114 and a dictionary table initial value creating section 115, in addition to the unit creating section 111, the dictionary retrieval section 112 and the variable length encoder 113 shown in FIG. 21. The image encoding apparatus shown in FIG. 26 differs from the image encoding apparatus shown in FIG. 21 in that, prior to carrying out the dictionary retrieval process, the statistics creating section 114 obtains the statistics of the units corresponding to N lines of the input image. In addition, the initial values of the dictionaries are determined by setting the dictionaries having the high frequency of generation to the indexes having the high level by the dictionary table initial value creating section 115. After the initial values of the dictionaries are determined, the unit creating section 111 creates the units from the start of the image, and the processes are successively carried out by the dictionary retrieval section 112 and the variable length encoder 113. As a result, it is possible to efficiently carry out the compression with respect to various images, independently of the input image.

A technique called the rational tangent screen is known as a method of creating a halftone dither matrix. This technique approximates a desired number of halftone lines and screen angles on a discrete grid. In this case, the shape of the dither matrix can be represented by parameters of two natural numbers (x, y), and the relationships of the following formulas (1) and (2) stand.

$$(\text{Number of Lines}) = (\text{Resolution}) \times (x^2+y^2)^{-1/2} \quad (1)$$

$$(\text{Angle}) = \arctan(x/y) \quad (2)$$

Figure 27A:
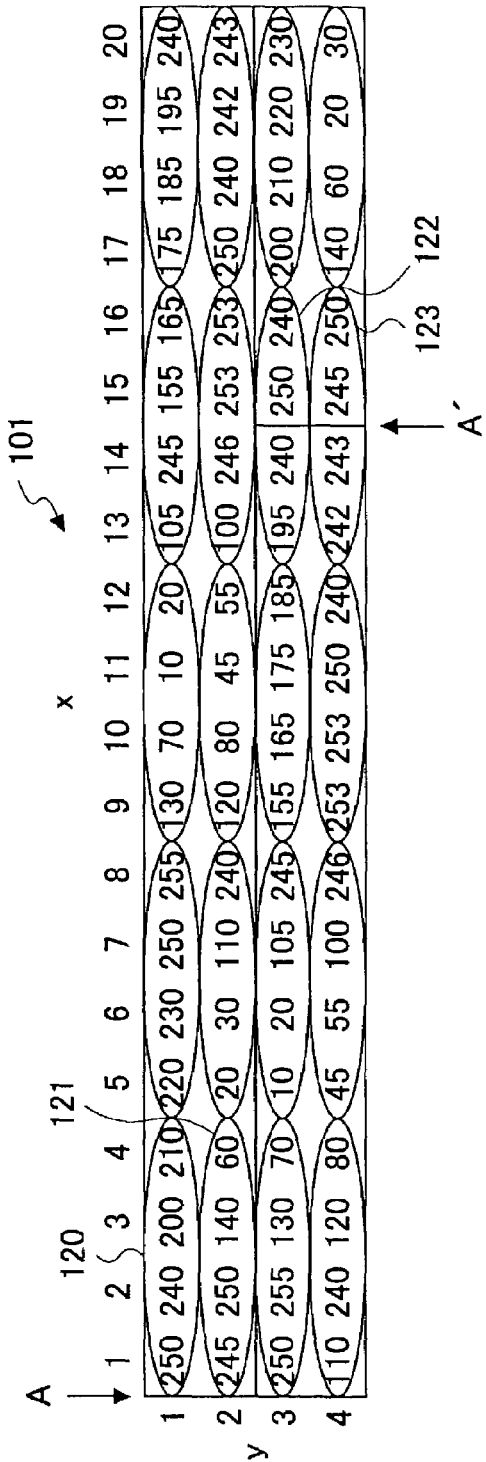
FIGS. 27A and 27B are diagrams for explaining units which are changed based on a parameter.
Figure 27B:
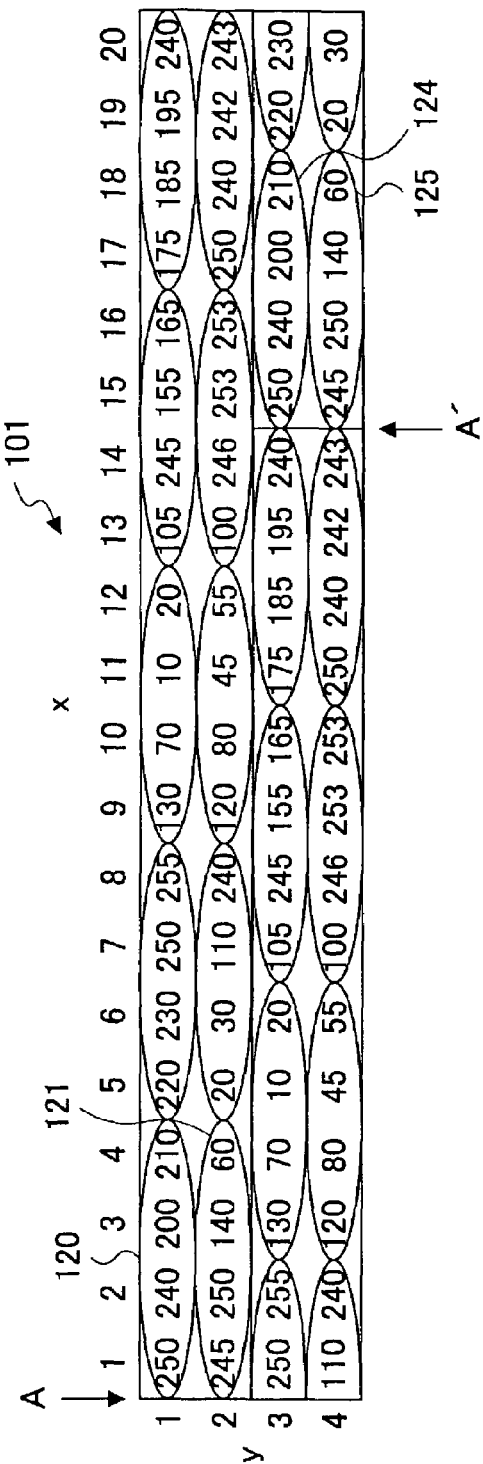

FIGS. 27A and 27B are diagrams for explaining the units which are changed based on a parameter. The dither matrix 101 shown in FIG. 27A has units 120, 121, 122 and 123 which are respectively formed by 4 pixels. On the other hand, the dither matrix 101 shown in FIG. 27B has units 120, 121, 124 and 125 which are also respectively formed by 4 pixels. If the resolution is 1200 dpi, the number of lines is 190 lpi, and the angle is 18 degrees, the formulas (1) and (2) can be used to obtain (x, y)=(6, 2). In other words, when the information of the dither matrix 101 is known, the parameters can be obtained simultaneously. In addition, according to the parameters obtained, the pattern in FIG. 27A is a repetition of a shift of 6 pixels in the direction x for every unit of 2 lines in the direction y. In the case shown in FIG. 27A, the threshold values "250" and "245" within the units 120 and 121 which are arranged from a position A indicating the start of the lines y=1 and y=2, are arranged in the same sequence within the units 122 and 123 from a position A' at lines y=3 and y=4.

In this state, if the unit is formed by N adjacent pixels from the start of each line as shown in FIG. 23A described above, where N=4, for example, the third line has the data of the first line shifted by 6 pixels in the direction x, and the pixels forming the unit becomes different between the first line and the third line. In other words, the patterns of the units increase. Accordingly, in the case shown in FIG. 27B, the position where the unit is formed is changed based on the obtained parameter. More particularly, the units 124 and 125 are formed from the position A' of the lines y=3 and y=4, so that the unit structure becomes the same as the corresponding units 120 and 121 which start from the position A of the lines y=1 and y=2. As a result, the unitized data have a high frequency of generation for all lines, that is, the data have a correlation.

However, the parameter described above is dependent on the dither matrix 101 which is assumed in advance, and the parameter is meaningless if the input image has been subjected to a dither process using other dither matrixes. Accordingly, it is possible to determine the parameter by learning from the input image data. In this case, the parameter does not become dependent on the dither matrix, and it becomes possible to efficiently carry out the compression with respect to various images.

FIGS. 28A and 28B are diagrams for explaining a parameter learning process. FIG. 28A shows a result of an exclusive-OR of the first line and the second line of the image data 102 which is applied with the dither matrix 101, and a total value 130 indicates the total value of the exclusive-OR operation. FIG. 28B shows a result of an exclusive-OR of the data obtained by shifting the data of the first and second lines by one pixel, and a total value 131 indicates the total value of the exclusive-OR operation. Although FIGS. 28A and 28B focuses on only several pixels of one line, the operation is actually carried out with respect to all pixels of one line. Alternatively, instead of carrying out the operation with respect to all pixels of one line, it is possible to carry out the operation with respect to at least a number of pixels greater than or equal to the period of the dither matrix 101 which is applied to the input image. First, the exclusive-OR of the data of the first line and the data of the second line is obtained, and the total value of the exclusive-OR results is obtained. The total value 130 for the case shown in FIG. 28A is "4". Then, the exclusive-OR of the data obtained by shifting the data of the first and second lines by one pixel is obtained, and the total value of the exclusive-OR results is obtained. The total value 131 for the case shown in FIG. 28B is "6". Accordingly, the data of the lines are shifted by an amount corresponding to all pixels, and the total value of the exclusive-OR results is obtained. It is possible to obtain the parameter by obtaining the shift (number of pixels) which results in the smallest total value for each line.

For example, suppose that a shift of 0 pixel results in the smallest total value of the exclusive-OR results for the second line, and the shift of 6 pixels results in the smallest total value of the exclusive-OR results for the third line. In this case, the parameter is found to be (6, 2). In addition, when the exclusive-OR is obtained by shifting the data of the lines by an amount corresponding to all pixels, a peak where the total value of the exclusive-OR results becomes small is generated several times. Such peaks which appear at a constant period corresponds to the period of the dither matrix. Since the parameter takes a value within the period of the dither matrix, it may be regarded unnecessary to calculate the exclusive-OR for the second and subsequent peaks. In order to omit such unnecessary calculations, the shift process described above is carried out for the pixels from the start of each line for the period of the dither matrix, if the period of the dither matrix is known in advance. By making the calculations based on the period of the dither matrix in this manner, it is possible to efficiently obtain the parameter.

A run-length encoding may be carried out in the variable length encoder 113 show in FIG. 21. In this case, the input data to the variable length encoder 113 has already been subjected to the dictionary retrieval process in the dictionary retrieval section 112. When the same data continues or N kinds of data are repeatedly generated, the dictionary retrieval process outputs the same indexes such as "2", "3", "4", "2", "3", "4", "2", "3", "4", ... The run-length encoding is employed to efficiently encode such indexes having the same values. With respect to the indexes and the runs, the variable length encoder 113 carries out a variable length encoding which allocates short codes to those having a high frequency of generation. Then, the indexes and the runs are not encoded independently, and the indexes and the runs are output in pairs.

Figure 29A:
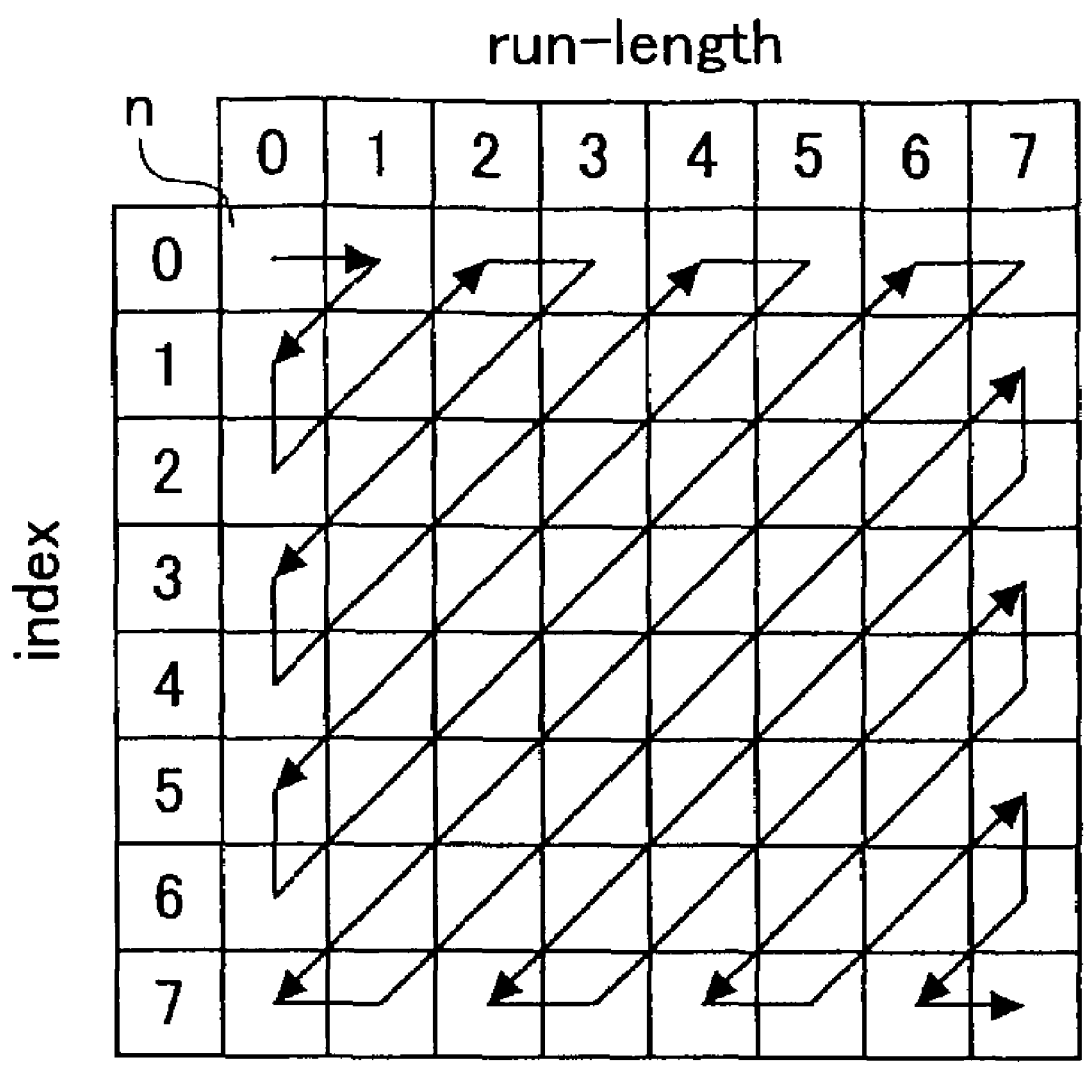
Figure 29C:
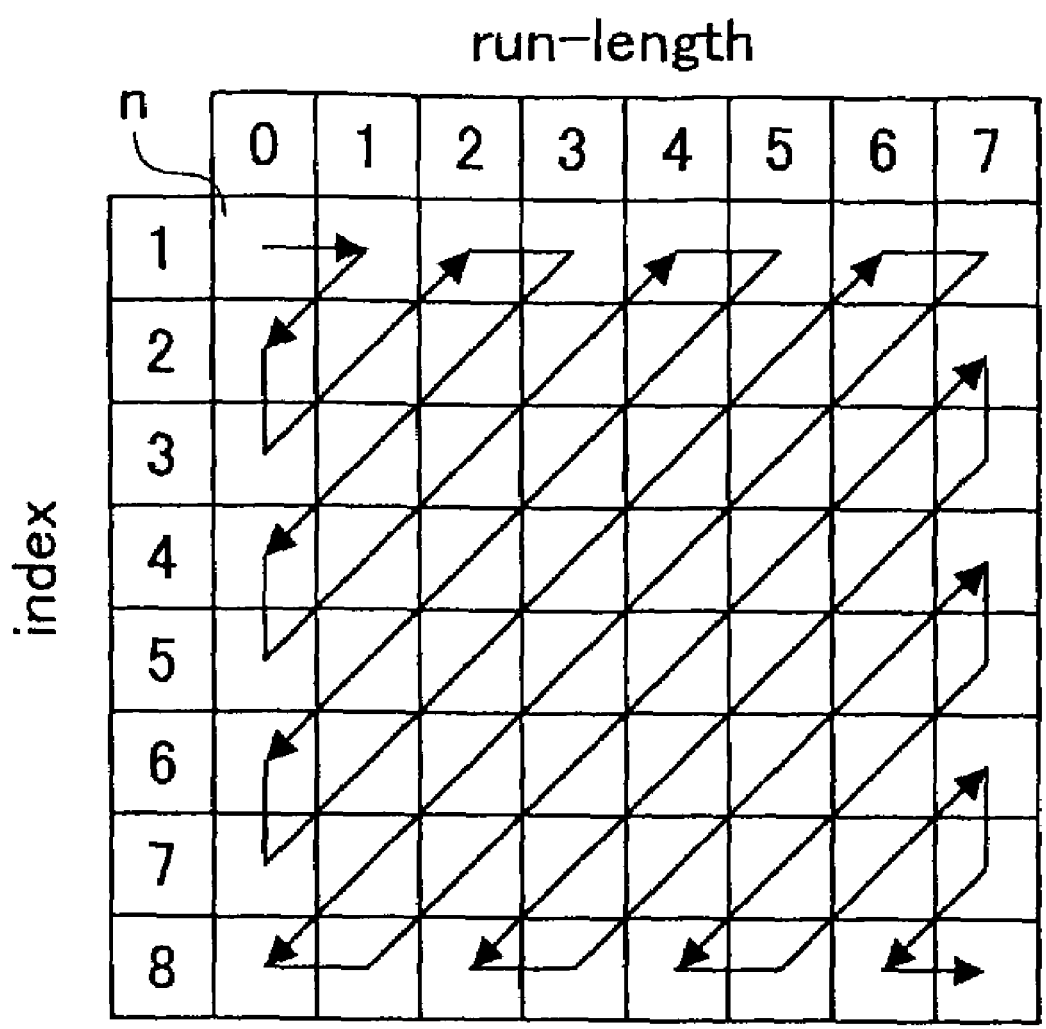

FIGS. 29A, 29B and 29C are diagrams for explaining a fifth embodiment of the encoding process. FIG. 29A shows a table of a corresponding relationship between the index and the run-length, and an output data n is obtained at the intersection of each index and run-length. The output data n shown in FIG. 29A corresponds to an input data n in a code table shown in FIG. 29B. As shown in FIGS. 29A and 29B, the short codes a sequentially allocated with respect to the output data n. This is based on the concept of allocating the short codes to the data having the high frequency of generation, and is similar to the concept utilized for the encoding of the AC coefficients of JPEG. For the sake of convenience, the maximum values of the index and the run are "7" in FIG. 29A, but a table which takes into consideration all possible values which are generated is actually created. The output data n which is output from the table show in FIG. 29A is encoded using the code table shown in FIG. 29B. The code table shown in FIG. 29B employs the Golomb-Rice code, but the code table is of course not limited to such a code. In the code table shown in FIG. 29B, any code values for the second order through sixteenth order may be used. In addition, as a method of creating the pairs, it is possible to employ a method which creates the pairs by using only the run of 0. In this case, the index 0 is not used for the output, and thus, the encoding is carried out by replacing the table shown in FIG. 29A by a table shown in FIG. 29C. By outputting such pairs, it is possible to reduce the number of events, and improve the compression efficiency.

If the number of pixels forming one unit is within the period of the dither matrix, the divisor of the dither period may be set to 2 pixels, 4 pixels, 8 pixels, 20 pixels or the like when the dither period is 40 pixels. In this case, since the data repeats based on the dither period, the correlation of the units increases when the units are sectioned for each dither period. In other words, it is possible to improve the compression efficiency by sectioning the units for each dither period.

Figure 30:
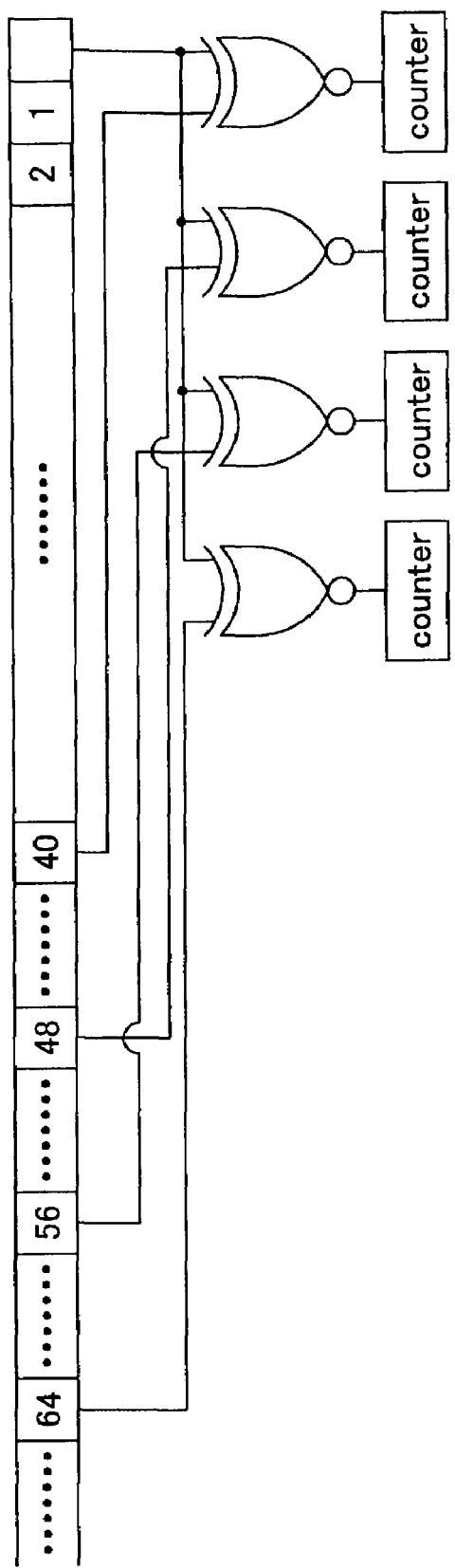
FIG. 30 is a diagram for explaining an image period detecting circuit.

FIG. 30 is a diagram for explaining an image period detecting circuit. The dither period used can be learned and determined from the input image data. For example, the dither period can be obtained from the peak having a smallest total value which is calculated from the exclusive-OR results as described above in conjunction with FIGS. 28A and 28B. In addition, N finite dither periods (40, 48, 56 and 64 pixels in this case) may be determined as shown in FIG. 30, and an exclusive-NOR (XNOR) circuit which obtains an exclusive-NOR of a target pixel and the pixels which are respectively separated by the dither periods is moved 1 pixel at a time, and a counter adds the result of the XNOR operation every time the XNOR circuit is moved. A maximum counted value of the counter is detected as the dither period of the image, because the data change is small and the data is most stable.

Figure 31:
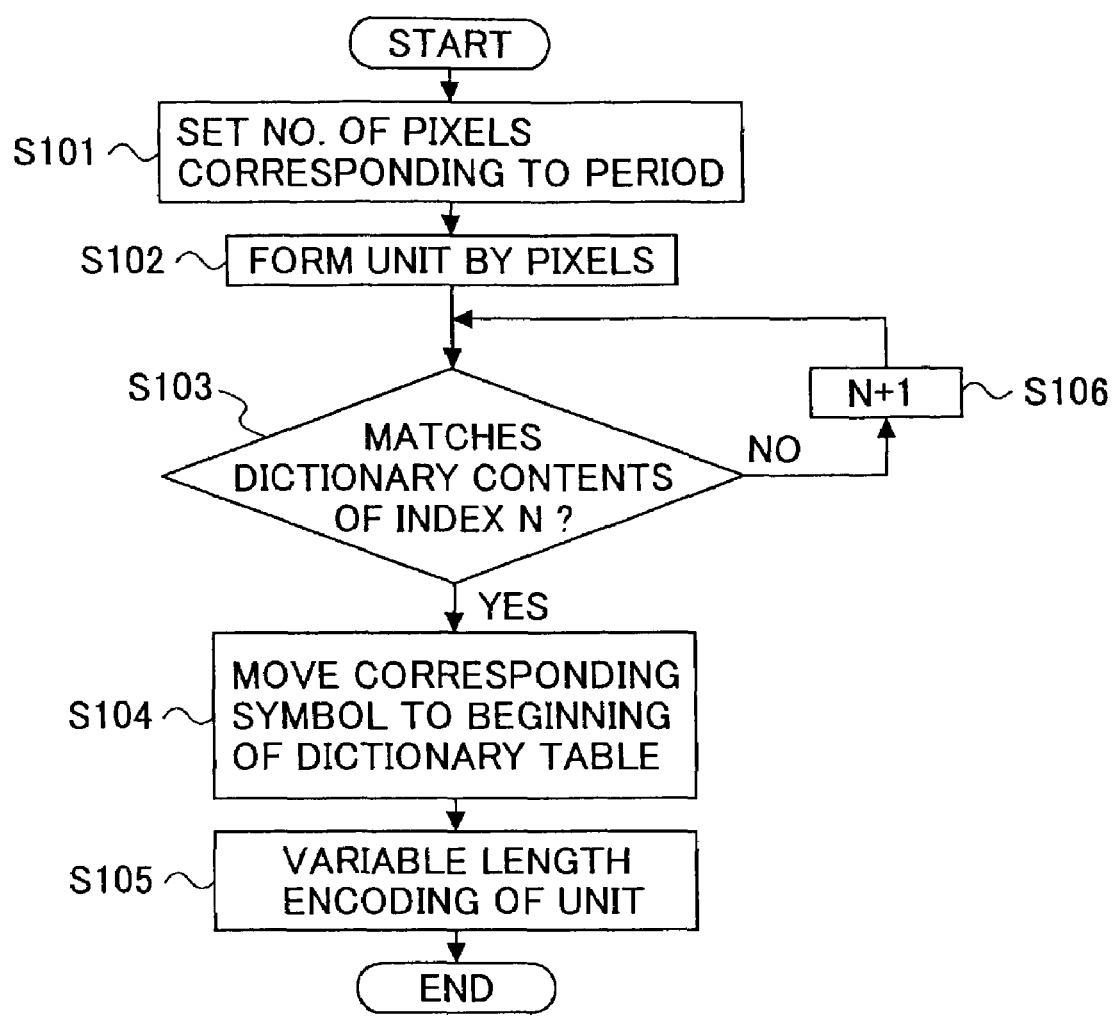
FIG. 31 is a flow chart for explaining a sixth embodiment of the encoding process.

FIG. 31 is a flow chart for explaining a sixth embodiment of the encoding process. In FIG. 31, a step 101 sets a number of pixels corresponding to the period of the imager data. For example, the number of pixels is set to 20 pixels, that is, the dither matrix size shown in FIGS. 23A and 23B, so as to match the period of the dither image. Next, a step S102 successively extracts the plurality of pixels within one period (20 pixels) to form the unit, and for example, one unit is formed by 4 pixels as shown in FIG. 23A. The number of pixels forming the unit is of course not limited to 4, and the number of pixels forming the unit may be set depending on the features of the image data. Then, a step S103 decides whether or not the pattern of the unit which is formed matches the contents of the dictionary having the index N. If the decision result in the step S103 is NO, a step S106 increments the index N by one, and the process returns to the step S103. In this case where the symbol size is 4 bits, it is assumed that all 16 kinds of dictionaries are prepared and that a dictionary with matching contents is always found. Hence, when the pattern of the unit is compared with the contents of the dictionaries starting from the dictionary having the index 0 and the decision result in the step S103 becomes YES, the matching index N is encoded. More particularly, a step S104 moves the corresponding symbol of the matching index N to the beginning of the dictionary table, and the process advances to a step S105.

By moving the symbol corresponding to the pattern of the input unit to the beginning of the dictionary table and continuously updating the dictionary table as described above, the frequently appearing symbols becomes located at the beginning portion of the dictionary table. In other words, the appearing probability of the dictionary indexes having small values becomes high. Hence, the step S105 can subject the dictionary index to the variable length encoding using the Huffmann code or the like, regardless of the originating probability of each symbol, so as to compress the data.

Figure 32:
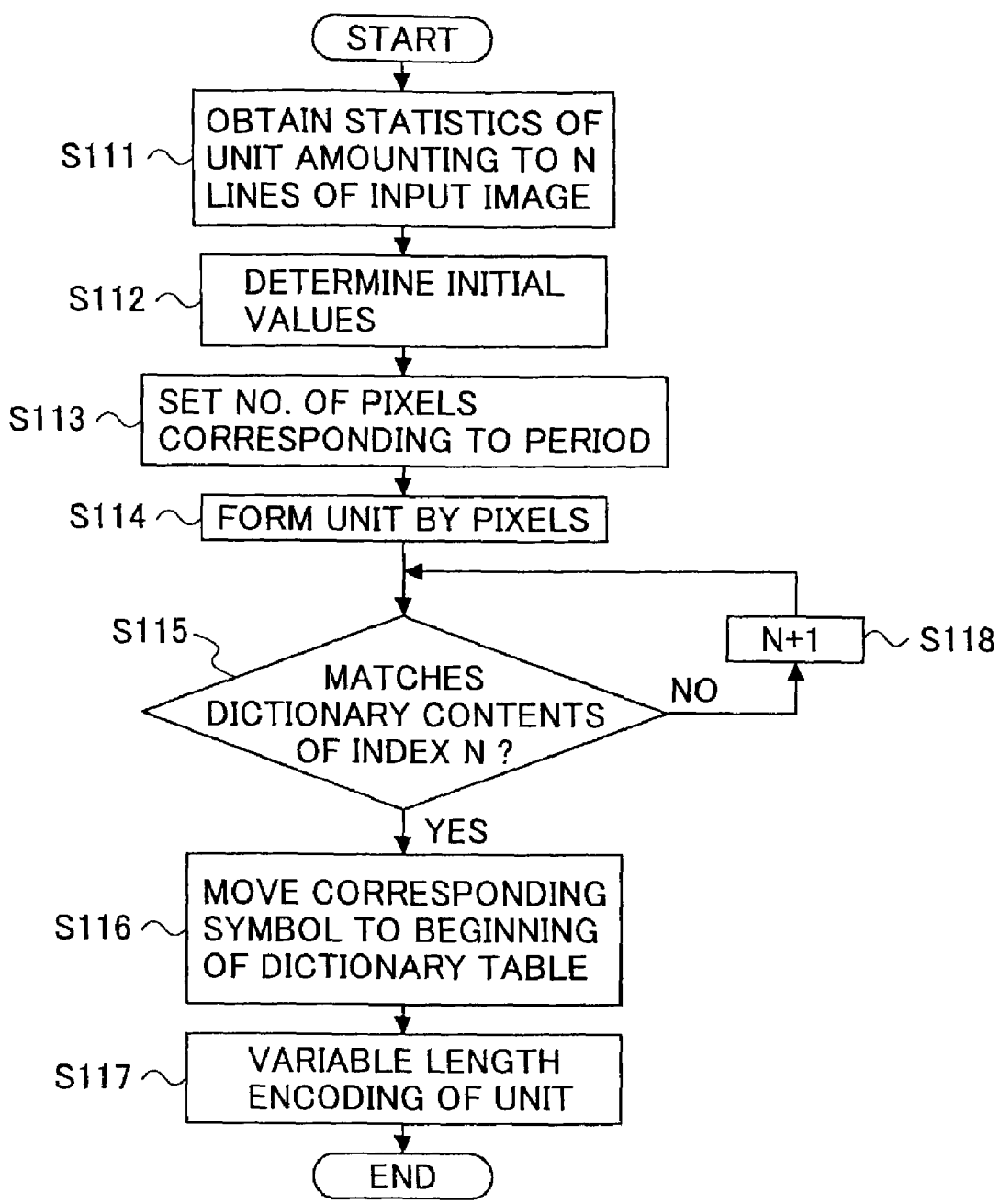
FIG. 32 is a flow chart for explaining a seventh embodiment of the encoding process.

FIG. 32 is a flow chart for explaining a seventh embodiment of the encoding process. In FIG. 32, a step S111 obtains the statistics of the patterns of the units amounting to N lines of the input image by the statistics creating section 114 described above, prior to carrying out the dictionary retrieval process. Then, a step S112 determines the initial values of the dictionaries (symbols) by setting the symbols corresponding to the patterns of the units having the high frequency of generation to the indexes having the high level, by the dictionary table initial value creating section 115. Thereafter, the encoding is carried out similarly to the image encoding procedure shown in FIG. 31. In other words, a step S113 sets a number of pixels corresponding to the period of the image data, in the encoding target digital image data. A step S114 forms the unit using a plurality of pixels of the pixels belonging to within one period of the image data, for example, by the unit creating section 111. Next, a step S115 decides whether or not the pattern of the unit which is formed matches the contents of the dictionary having the index N. If the decision result in the step S115 is NO, a step S118 increments the index N by one, and the process returns to the step S115. In the case where the symbol size is 4 bits, it is assumed for the sake of convenience that all 16 kinds of dictionaries are prepared and that a dictionary with matching contents is always found. Hence, when the pattern of the unit is compared with the contents of the dictionaries starting from the dictionary having the index 0 and the decision result in the step S115 becomes YES, the matching index N is encoded. More particularly, a step S116 moves the corresponding symbol of the matching index N to the beginning of the dictionary table, and the process advances to a step S117.

By moving the symbol corresponding to the pattern of the input unit to the beginning of the dictionary table and continuously updating the dictionary table as described above, the frequently appearing symbols becomes located at the beginning portion of the dictionary table. In other words, the appearing probability of the dictionary indexes having small values becomes high. Hence, the step S117 can subject the dictionary index to the variable length encoding using the Huffmann code or the like, regardless of the originating probability of each symbol, so as to compress the data. According to this embodiment, it is possible to compress various images with a high efficiency, regardless of the input image, by statistically determining the symbols which are registered as the initial values of the dictionary table.

Figure 33:
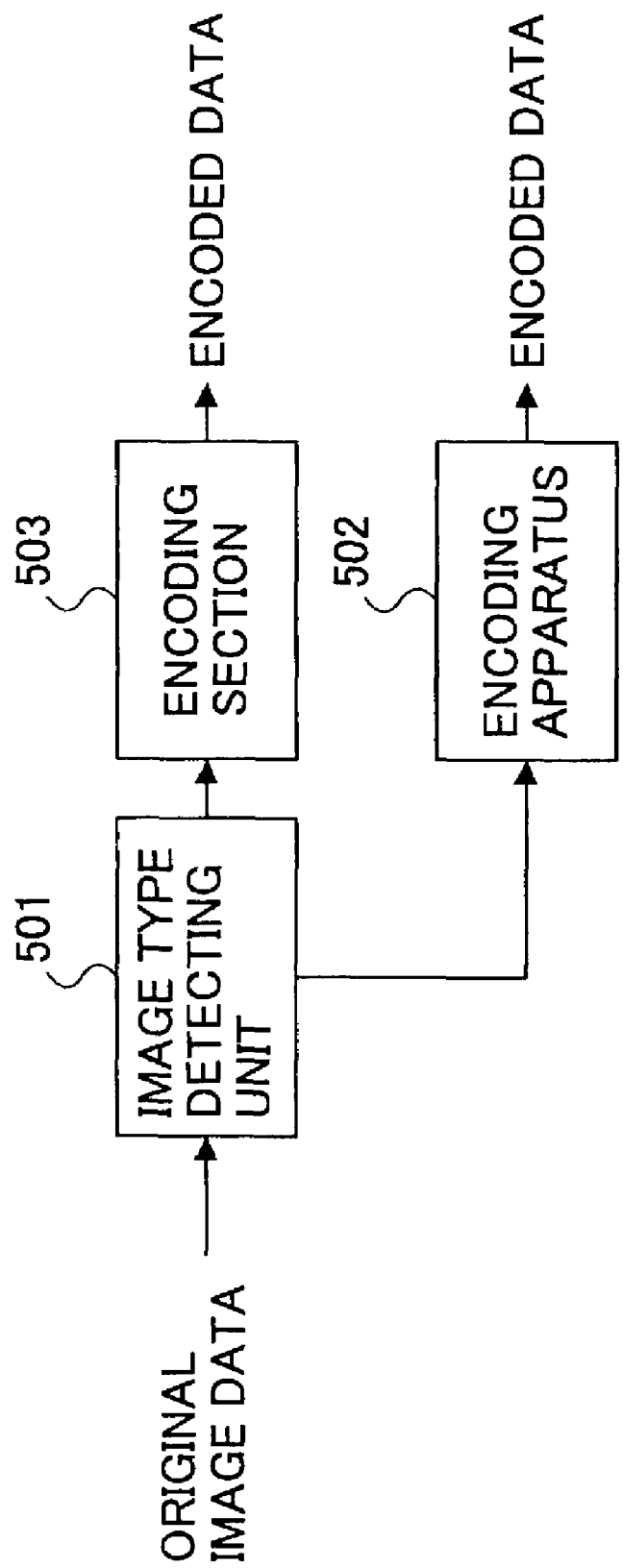
FIG. 33 is a system block diagram showing a sixth embodiment of the image encoding apparatus according to the present invention.

FIG. 33 is a system block diagram showing a sixth embodiment of the image encoding apparatus according to the present invention. This sixth embodiment of the image encoding apparatus employs an eighth embodiment of the encoding process.

The image encoding apparatus shown in FIG. 33 includes an image type detecting unit 501, and encoding apparatuses 502 and 503. The image type detecting unit 501 detects the type of input original image data, that is, whether or not the original image data has a periodic property. If the original image data does not have a periodic property, the image type detecting unit 501 supplies the original image data to the encoding apparatus 502 which carries out a known encoding process, so as to output the encoded data. On the other hand, if the original image data has the periodic property, the image type detecting unit 501 supplies the original image data to the encoding apparatus 503 which carries out the encoding process of the present invention, so as to output the encoded data. In other words, the encoding apparatus 503 carries out the operations of any of the embodiments of the image encoding apparatus according to the present invention described above or, the processes of any of the embodiments of the image encoding process according to the present invention described above. The image type detecting unit 501 functions as a switch for selectively supplying the original image data to the encoding apparatus 502 if the original image data has no periodic property, and for selectively supplying the original image data to the encoding apparatus 503 if the original image data has the periodic property. The image type, that is, whether or not the original image data has the periodic property, can be detected by a known means, such as detecting the image type based on predetermined dither matrixes, for example.

According to this embodiment, it is possible to carry out a suitable encoding process which is appropriate for each type of image data.

The embodiments of the image encoding apparatus employ embodiments of the image encoding method according to the present invention or, the embodiments of the image encoding process described above. Furthermore, a computer-readable storage medium according to the present invention stores a computer program for causing a computer or information processing apparatus, such as a personal computer, to carry out any of the described embodiments of the image encoding process.

In other words, the computer-readable storage medium is formed by a recording medium which stores a computer program for causing a computer to function as any of the described embodiments of the image encoding apparatus. The recording medium may be selected from CD-ROMs, magneto-optical disks, DVD-ROMs, floppy disks, flash memories, memory cards, memory sticks, various kinds of ROMs, various kinds of RAMs, and any media capable of storing the computer program in a computer-readable form. The computer which executes the computer program may read the computer program from the computer-readable storage medium which is loaded into the computer or, read the computer program from the computer-readable storage medium via a communication means such as a modem via one or more networks. In addition, the computer program may be preinstalled in the computer-readable storage medium, such as a hard disk drive (HDD), of the computer.

Further, the present invention is not limited to these embodiments, but various variations and modifications may be made without departing from the scope of the present invention.

What is claimed is:

1. An image encoding method, comprising the steps of:
    (a) forming units respectively made up of a plurality of pixels belonging to within one period of a digital image data having a periodic property;
    (b) carrying out an encoding using the units as units of encoding so that two units which are consecutively encoded are separated by an integer multiple of the period, wherein said step (b) uses a dictionary table which registers symbols used for the encoding; and
    (c) comparing a pattern of the unit and the registered symbols in the dictionary table, and moving a matching registered symbol to a beginning portion of the dictionary table.

2. An image encoding apparatus, comprising:
    unit forming means for forming units respectively made up of a plurality of pixels belonging to within one period of a digital image data having a periodic property; and
    encoding means for carrying out an encoding using the units as units of encoding so that two units which are consecutively encoded are separated by an integer multiple of the period,
    wherein the pixels belonging to the units have similar originating probabilities indicating eases of becoming black or white pixels.

3. The image encoding apparatus as claimed in claim 2, wherein the originating probabilities are obtained for each phase within the period by measuring a number of black or white pixels.

4. An image encoding apparatus, comprising:
    unit forming means for forming units respectively made up of a plurality of pixels belonging to within one period of a digital image data having a periodic property; and encoding means for carrying out an encoding using the units as units of encoding so that two units which are consecutively encoded are separated by an integer multiple of the period, wherein the pixels belonging to the units have similar changing probabilities of pixel values between two pixels separated by the integer multiple of the period.

5. The image encoding apparatus as claimed in claim 4, wherein the changing probabilities are obtained for each phase within the period by measuring a number of pixels for which a pixel value of a next pixel separated by one period changes.

6. An image encoding apparatus, comprising:

unit forming means for forming units respectively made up of a plurality of pixels belonging to within one period of a digital image data having a periodic property; and encoding means for carrying out an encoding using the units as units of encoding so that two units which are consecutively encoded are separated by an integer multiple of the period, wherein the number of pixels belonging to one unit is not constant among the units.

7. The image encoding apparatus as claimed in claim 6, wherein the number of pixels belonging to the unit is adaptively determined based on encoded units of the digital image data.

8. An image encoding apparatus, comprising:

unit forming means for forming units respectively made up of a plurality of pixels belonging to within one period of a digital image data having a periodic property;

encoding means for carrying out an encoding using the units as units of encoding so that two units which are consecutively encoded are separated by an integer multiple of the period, wherein said encoding means uses a dictionary table which registers symbols used for the encoding; and updating means for comparing a pattern of the unit and the registered symbols in the dictionary table, and moving a matching registered symbol to a beginning portion of the dictionary table.

9. A computer-readable storage medium which stores a program for causing a computer to carry out an image encoding process, said program comprising:

a procedure which causes the computer to form units respectively made up of a plurality of pixels belonging to within one period of a digital image data having a periodic property;

a procedure which causes the computer to carry out an encoding process using the units as units of encoding so that two units which are consecutively encoded are separated by an integer multiple of the period, including using a dictionary table, which registers symbols used for the encoding; and a procedure which compares a pattern of the unit and the registered symbols in the dictionary table, and moves a matching registered symbol to a beginning portion of the dictionary table.

10. A computer-readable storage medium which stores a program for causing a computer to carry out an image encoding process, said program comprising:

a procedure which causes the computer to form units respectively made up of a plurality of pixels belonging to within one period of a digital image data having a periodic property; and a procedure which causes the computer to carry out an encoding process using the units as units of encoding so that two units which are consecutively encoded are separated by an integer multiple of the period, wherein the pixels belonging to the units have similar originating probabilities indicating eases of becoming black or white pixels.

11. A computer-readable storage medium which stores a program for causing a computer to carry out an image encoding process, said program comprising:

a procedure which causes the computer to form units respectively made up of a plurality of pixels belonging to within one period of a digital image data having a periodic property; and a procedure which causes the computer to carry out an encoding process using the units as units of encoding so that two units which are consecutively encoded are separated by an integer multiple of the period, wherein the pixels belonging to the units have similar changing probabilities of pixel values between two pixels separated by the integer multiple of the period.

* * * * *